(12) United States Patent
Miyashita

(10) Patent No.: US 7,263,269 B2
(45) Date of Patent: Aug. 28, 2007

(54) MOUNTING CASE FOR ELECTRO-OPTICAL DEVICE, METHOD OF MANUFACTURING MOUNTING CASE FOR ELECTRO-OPTICAL DEVICE, ELECTRO-OPTICAL DEVICE, AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/305,605

(22) Filed: Dec. 16, 2005

(65) Prior Publication Data

US 2006/0133765 A1    Jun. 22, 2006

(30) Foreign Application Priority Data

Dec. 17, 2004 (JP) ............................. 2004-366566

(51) Int. Cl.
    *G02B 6/00* (2006.01)
    *G03B 21/18* (2006.01)
    *G03B 21/14* (2006.01)
    *G02F 1/1333* (2006.01)

(52) U.S. Cl. .................... 385/147; 349/58; 353/54; 353/20

(58) Field of Classification Search .............. None
    See application file for complete search history.

(56) References Cited

U.S. PATENT DOCUMENTS 5,170,195 A * 12/1992 Akiyama et al. ............ 353/54

5,442,470 A * 8/1995 Hashimoto .................. 349/58
2001/0040669 A1 * 11/2001 Aoto et al. .................. 353/20

FOREIGN PATENT DOCUMENTS

| JP | 2002-107698 |   | 4/2002 |
| JP | 2003-005104 | A | 1/2003 |
| JP | 2003-015104 | A | 1/2003 |
| JP | 2004-198933 | A | 7/2004 |
| JP | 2004-212956 | * | 7/2004 |
| JP | 2004-212956 | A | 7/2004 |
| KR | 2004-55655 |   | 6/2004 |

* cited by examiner

*Primary Examiner*—Sung Pak
*Assistant Examiner*—Hoang Tran
(74) *Attorney, Agent, or Firm*—AdvantEdge Law Group, LLC

(57) ABSTRACT

The inventions relate generally to a mounting case for an electro-optical device that includes a main body having a plate member formed by a pressing process, a bottom portion, and side portions continuous with the bottom portion to surround a side edge of the electro-optical panel so that the electro-optical panel may be accommodated therein. A heat-radiating blade corresponding to the circumferential edge of the main body of the plate member is partially formed by a pressing process and extends from the main body to the outside of the main body. A cooling air introducing portion extends from the circumferential edge in a direction toward the bottom portion for directing cooling air across the main body and over the heat-radiating blade for cooling the electro-optical panel. Detailed information on various example embodiments of the inventions are provided in the Detailed Description below, and the inventions are defined by the appended claims.

16 Claims, 28 Drawing Sheets

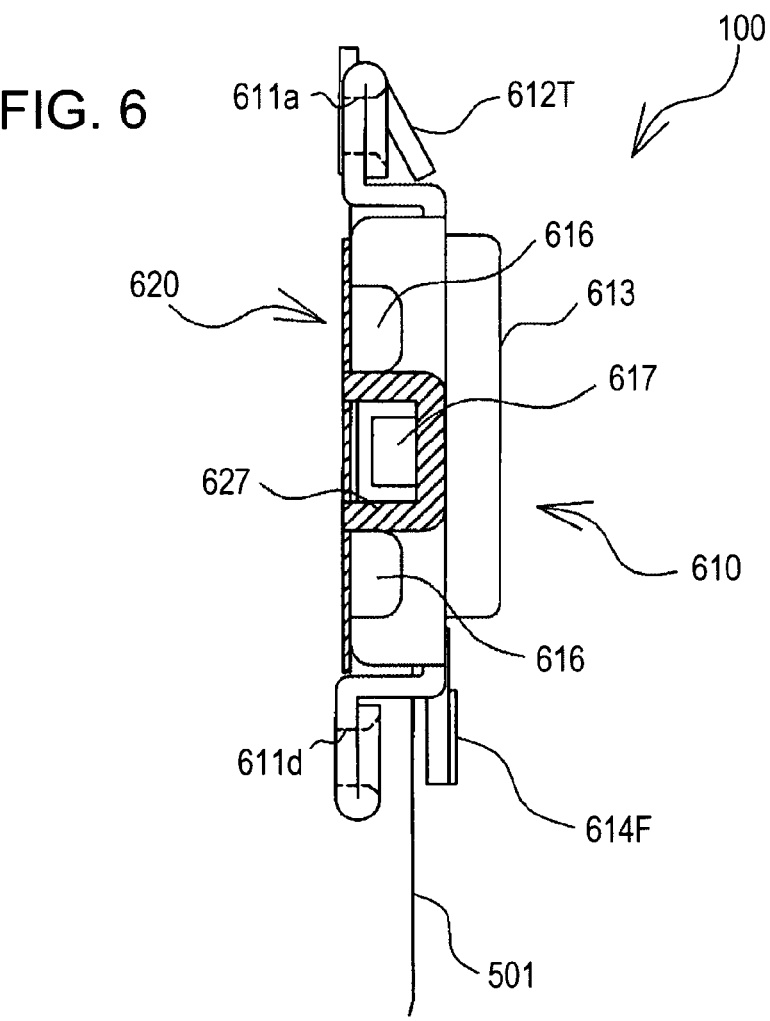
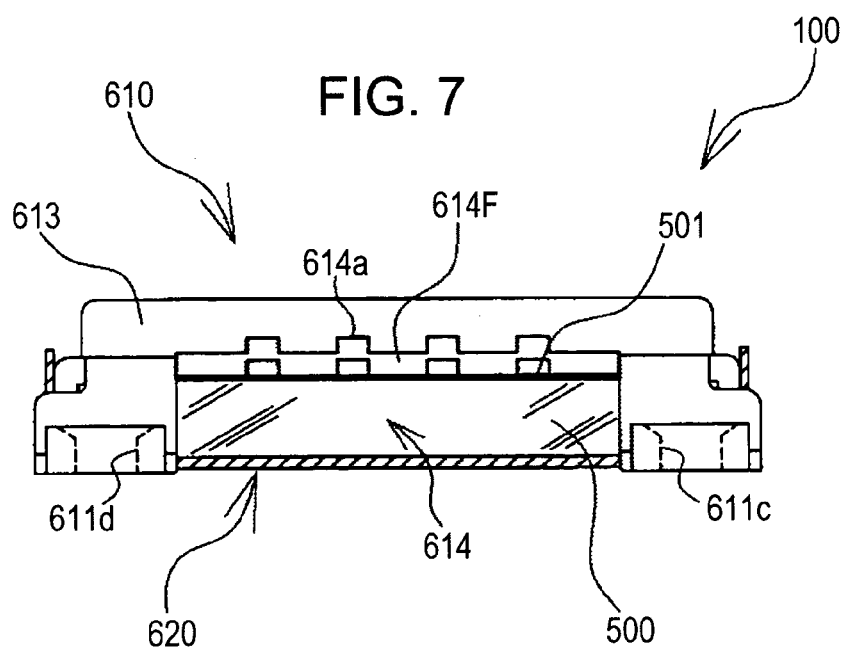

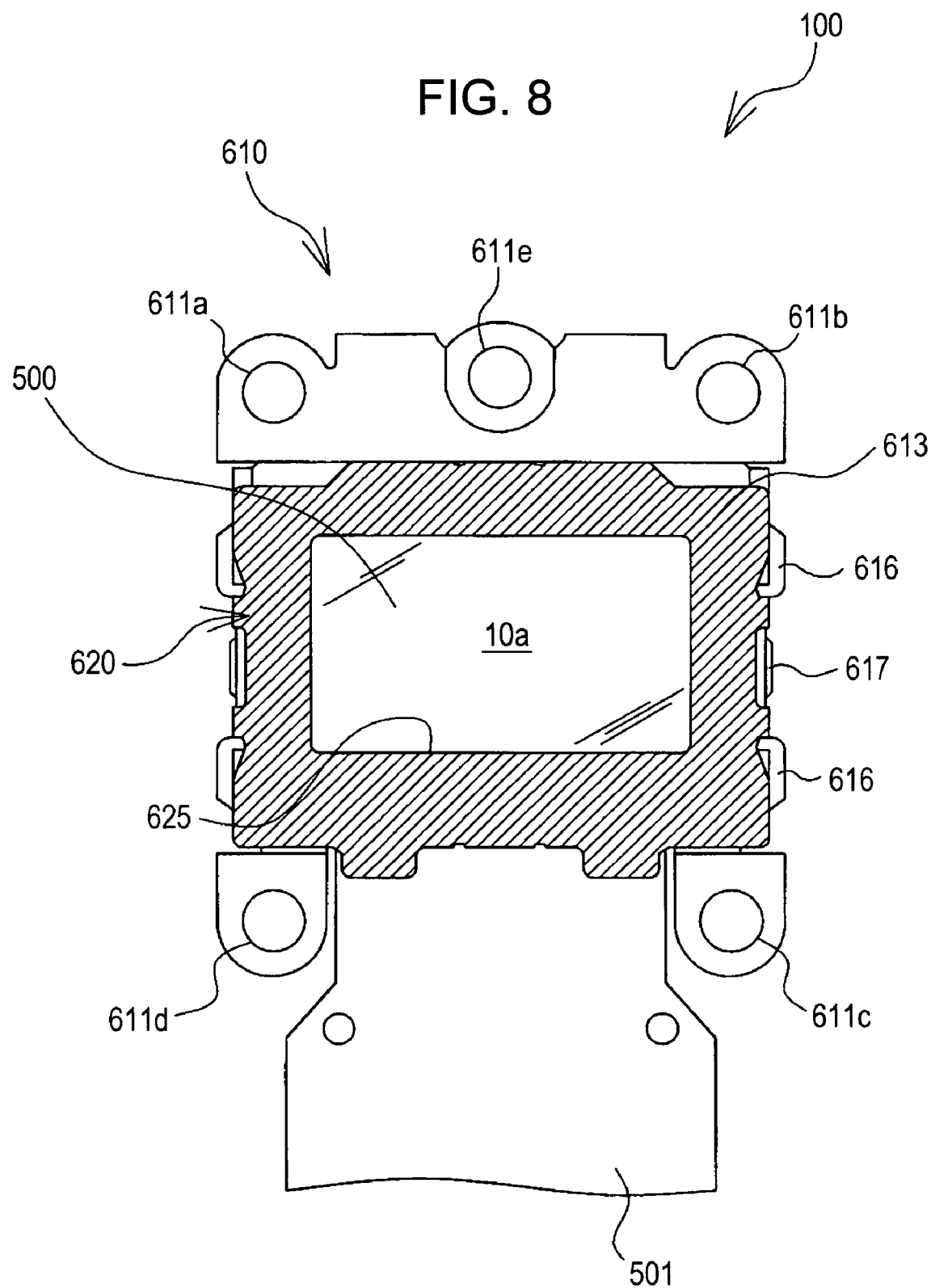

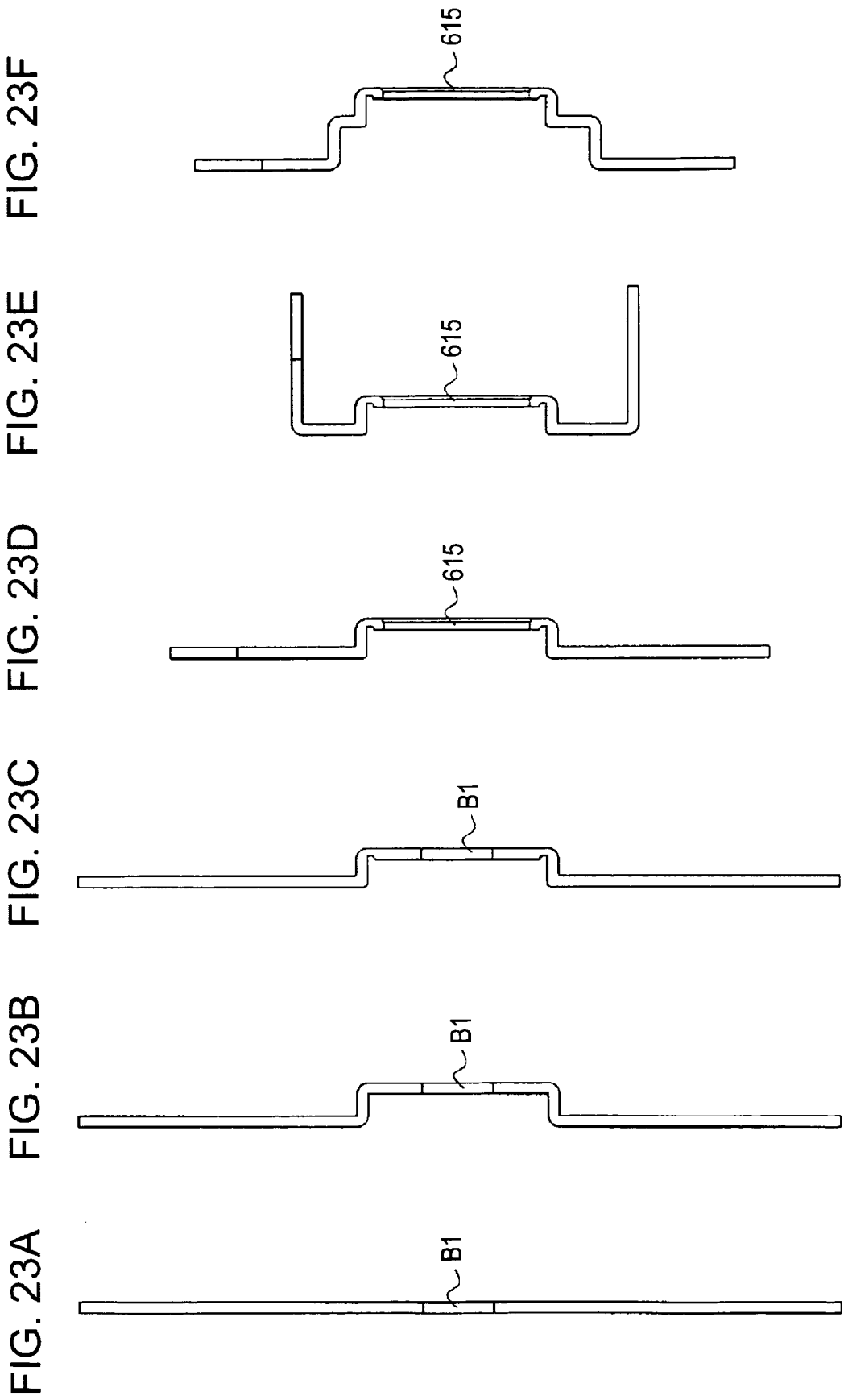

FIG. 27
FIG. 28
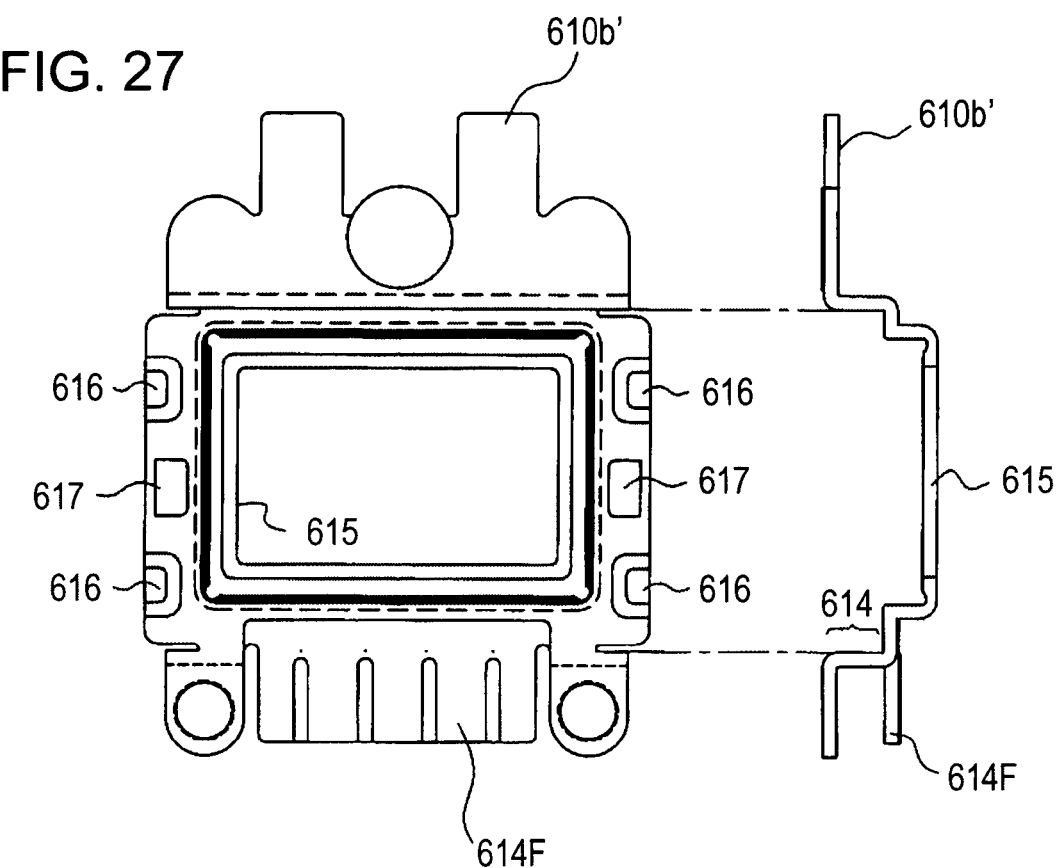
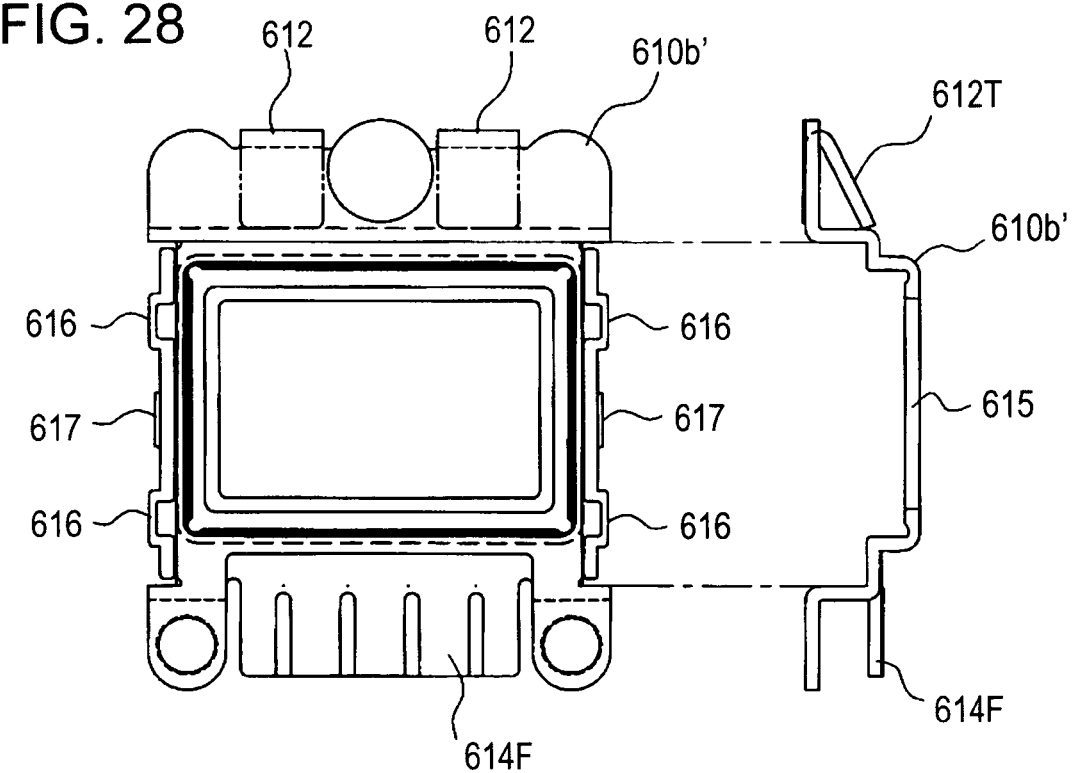

MOUNTING CASE FOR ELECTRO-OPTICAL DEVICE, METHOD OF MANUFACTURING MOUNTING CASE FOR ELECTRO-OPTICAL DEVICE, ELECTRO-OPTICAL DEVICE, AND ELECTRONIC APPARATUS

BACKGROUND

1. Technical Field

The present invention relates to a mounting case, which is used for mounting an electro-optical panel such as a liquid crystal panel in an electro-optical device such as a liquid crystal device, to a method of manufacturing the same, to an electro-optical device including such a liquid crystal panel, and to an electronic apparatus such as a liquid crystal projector which uses the electro-optical device, for example, as a light valve.

2. Related Art

When this type of electro-optical panel is used as a light valve in an electronic apparatus such as a liquid crystal projector, the electro-optical panel is not installed into a case body, a casing, or a frame of the apparatus in an exposed state, but it is mounted or accommodated in a proper mounting case to be installed. The reason why an electro-optical panel is accommodated in a mounting case is that the fixing, the attaching, and the optical-positioning of the electro-optical panel with respect to a case body or the like can be easily performed by providing a proper screw hole in the mounting case.

Moreover, in this specification, the construction where a single electro-optical panel performing an electro-optical operation is accommodated in a mounting case or where an electro-optical panel connected to a flexible wiring substrate or the like is accommodated in a mounting case is called 'the electro-optical device' as a whole.

In an electronic apparatus such as a projector, light projected on an electro-optical panel is considerably intense. Therefore, in order to prevent an electro-optical panel from being deteriorated by a high temperature, a cooling mechanism has been provided in a mounting case as described in JP-A-2004-198933, JP-A-2003-5104, and JP-A-2002-107698. Specifically, on the surface of a mounting case, a fin, an inclined portion, or a tapered portion is provided. An inclined portion or a tapered portion acts so as to reduce the resistance of a mounting case with respect to the flow of cooling air to be supplied into an electronic apparatus by a fan and efficiently guides the cooling air to the surface of a mounting case.

As such, a mounting case has functions of cooling an electro-optical panel as well as simply accommodating the electro-optical panel, as described above. Therefore, a mounting case has a relatively complicated shape. For this reason, a mounting case is generally manufactured by die-casting. In general, die-casting indicates a technique and product where a melted alloy of aluminum, magnesium, or zinc is injected into a mold at high speed and high pressure so as to be molded. Die-casting has an advantage in that high dimensional precision is achieved and a product having a complicated shape can be manufactured.

In die-casting, however, there is a problem in that the degradation of the manufacturing quality of the mounting case occurs due to burrs or erosion.

SUMMARY

An advantage of some aspects of the invention is that it provides a mounting case for an electro-optical device which can be manufactured with a stable manufacturing quality and at low cost, a method of manufacturing the mounting case, an electro-optical device, and an electronic apparatus including the electro-optical device.

According to an aspect of the invention, a first mounting case for an electro-optical device is used in an electro-optical device on which a display image is displayed and accommodates an electro-optical panel having an image display region on which the display image is displayed. The mounting case includes a main body that has a plate member formed by a pressing process, a bottom portion opposite to the peripheral region located around the image display region in the electro-optical panel and side portions continuous with the bottom portion to surround the side edge of the electro-optical panel so that the electro-optical device is accommodated therein; and a heat-radiating blade into which a portion corresponding to the circumferential edge of the main body of the plate member is partially formed by a pressing process and that extends from the main body to the outside of the main body.

According to the first mounting case for an electro-optical device according to the aspect of the invention (hereinafter, properly abbreviated as 'the mounting case'), the mounting case has a plate member formed by a pressing process. For this reason, the deterioration of manufacturing quality caused by burr or erosion which occurs at the time of performing die-casting can be prevented. In addition, by switching a manufacturing technique from die-casting to a pressing process, mass production is made easier, and the life span of a mold is increased so that a manufacturing cost can be reduced.

However, when manufactured by die-casting, a mounting case can be molded to have a relatively complicated shape. The mounting case includes various cooling mechanisms which generally suppress the rise in temperature of the electro-optical panel caused by projected light. For example, on the surface of a mounting case, an air cooling fan or heat pipe is integrally molded, or a main body of the mounting case is designed to introduce cooling air onto the surface or to the inside. Generally speaking, when a cooling mechanism is attached on a mounting case, it is considered that die-casting is more suitable than a pressing process.

In contrast, in the first mounting case of the invention, the main body which accommodates an electro-optical panel and the heat-radiating blade are formed of a plate member made of an aluminum plate or the like. The blade, which is formed by processing a predetermined portion of a plate member in a pressing process, extends to the outside of the main body from the circumferential edge of the main body. The blade is formed at the same time or consecutively with the processing of main body. Moreover, 'a pressing process' in the invention is not only a process of forming the main body, but also indicates an entire process by the pressing process according to the manufacturing of mounting case. In addition, 'a pressing process' with respect to the blade means that a portion of a plate member becoming the blade is efficiently processed, and also means that another portion of the plate member is processed so that the entire blade or a portion thereof is obtained. In addition, in the case of 'a plate member' which is referred as, a plurality of plate members may be combined with each other. However, in terms of a quality or manufacturing efficiency, it is preferable that a mounting case as a whole have a plate member. Moreover, components made of other members may be attached on a plate member consecutively with a pressing process.

If the blade is attached to the main body, the structure becomes complicated. Therefore, it is difficult to reliably form such a structure by a pressing process. In the case of the invention, however, a portion corresponding to the circumferential edge of the main body of a plate member including a portion becoming the main body may be partially deformed, so that the structure can be relatively easily implemented. Moreover, 'a portion corresponding to the circumferential edge of the main body' in the invention indicates a portion which is formed by constructing a circumferential portion (for example, a side portion or the like) in the invention, a portion which further extends from an original constructional portion of the main body, or a portion extending across both sides.

The blade to be formed in such a manner acts to promote the radiation of the heat of the mounting case. In other words, in the first mounting case, the electro-optical panel is accommodated in the main body, and the heat which the electro-optical panel emits is conducted to the main body by the absorption of heat so as to be radiated to the outside of the mounting case from the surface of the blade which extends from the main body and is integrally formed with the main body. At this time, since the blade is integrally formed with the main body, a heat conductivity from the main body to the blade can be easily improved. As a result, a cooling efficiency of the electro-optical panel is improved, and hot spots in the electro-optical panel are suppressed from being generated. Accordingly, a display quality in the electro-optical device and the electronic apparatus can be prevented from being degraded.

Moreover, in the first mounting case, components other than the main body and the blade may be added. It is preferable that the other components be formed by a pressing process in terms of manufacturing efficiency. However, when the manufacturing of components becomes complicated, the components may be molded by die-casting or the like to be bonded to or engaged with the main body or the like.

As described above, in the first mounting case of the invention, at least the main body and the blade is manufactured by a pressing process. Therefore, the deterioration of quality caused by burr or erosion occurring at the time of performing die-casting is reduced or does not occur, so that the mounting case can be manufactured with a consistent manufacturing quality and at low cost. In other words, the first mounting case of the invention can be implemented by a pressing process, even with a slightly complicated structure of the heat-radiating blade. Furthermore, by including the bladed portion, the first mounting case has a cooling function, which is required for a mounting case, to be sufficiently utilized.

According to another aspect of the invention, steps are formed on both surfaces of the blade by a half punching process in the pressing process.

According to the aspect, as a part of a pressing process, the blade is not entirely punched out, but is punched out by half of the thickness. In other words, the steps are formed on both surfaces by a half punching process. The plurality of steps are formed in a straight line so that the blade as a whole is formed in a corrugated-plate shape. As such, with the steps being formed on both surfaces, the surface area of the blade is increased, and a radiation efficiency is improved. Accordingly, a cooling function of the mounting case can be improved.

Moreover, if the steps are formed so that the direction of grooves on blade caused by the steps coincides with the direction of cooling air, the steps act so as to adjust the flow direction of cooling air. Therefore, a cooling efficiency of the mounting case can be improved even more.

According to a further aspect of the invention, at least a portion of the blade is formed in a comb-teeth-like shape by a press punching process in the pressing process.

According to the aspect, the whole blade or a portion thereof is formed in a comb-teeth-like shape by a press punching process as a part of a pressing process. Even in this case, the surface area of the blade is increased, so that a cooling function of the mounting case can be improved. In addition, if the extending direction of comb teeth coincides with the direction of cooling air, the direction of the cooling air is adjusted by the blade, so that a cooling efficiency of the mounting case can be more enhanced.

According to a still further aspect of the invention, in a state where one end of a flexible wiring substrate for sending an electric signal to the electro-optical panel is connected to the circumferential edge of the electro-optical panel, an opening for drawing out the other end of the flexible wiring substrate from the inside of the main body to the outside is formed in the position corresponding to a portion processed into the blade in the circumferential edge of the main body, so that the main body accommodates the electro-optical panel.

According to the aspect, as a predetermined portion in the circumferential edge of the main body is processed as the bladed portion, an opening to be formed in the region occupied by the predetermined portion, that is, a notched portion is used as an opening for leading out the flexible wiring substrate from the inside of the main body to the outside. In other words, with the structure being simplified, the opening for the flexible wiring substrate is provided when the opening formed in the portion processed into the blade is arranged. Specifically, on the circumferential edge along one side of the bottom portion in the main body, the blade is formed at the same time when the opening is formed. Here, the number of flexible wiring substrates to be connected to the electro-optical panel and the number of openings to be defined in the mounting case are not particularly limited.

Such a simplified structure is suitable for a pressing process, significantly contributes to implementation of the first mounting case of the invention and simplification of the manufacturing process as well.

According to a still further aspect of the invention, the blade is formed in one side of the bottom portion in plan view, and a portion of the plate member, which corresponds to the circumferential edge of the main body and is positioned in a side opposite to the one side of the bottom portion in plan view, is partially formed by a pressing process. The mounting case further includes a cooling air introducing portion having a slope that introduces cooling air supplied toward the main body onto the outer surface of the bottom portion.

According to the aspect, the blade is disposed opposite to the cooling air introducing portion in plan view. Since the slope of the cooling air introducing portion adjusts the flow of cooling air to introduce onto the outer surface of the bottom portion, the cooling air to be guided to the slope passes on the surface or the periphery of the blade. Accordingly, a radiation action is promoted in the blade, so that a cooling efficiency of the mounting case can be more enhanced. Furthermore, like the blade, the cooling air introducing portion can be integrally formed with the main body, so that a heat conductivity from the main body to the cooling air introducing portion can be easily enhanced.

According to a still further aspect of the invention, at least the main body and the blade are formed of one plate member.

According to the aspect, a portion constructed by including at least the main body and the blade is formed of a sheet of plate member subjected to a pressing process. In other words, the main body and the blade are completely integrally formed. For this reason, a complicated step for bonding a plurality of plate members bonded are not necessary, so that the mounting case can be efficiently manufactured.

According to a still further aspect of the invention, a second mounting case for an electro-optical device, which is used in an electro-optical device on which a display image is displayed and accommodates an electro-optical panel having an image display region on which the display image is displayed, includes a main body that has a plate member formed by a pressing process, a bottom portion opposite to the peripheral region located around the image display region in the electro-optical panel and side portions continuous with the bottom portion to surround the side edge of the electro-optical panel so that the electro-optical device is accommodated therein; and a cooling air introducing portion into which a portion corresponding to the circumferential edge of the main body of the plate member is partially formed by pressing process and that is formed by a bending process in the pressing process so as to introduce cooling air supplied toward the main body onto the outer surface of the bottom portion.

According to the aspect, the second mounting case is formed of a plate member subjected to a pressing process like the first mounting case. For this reason, the deterioration of the manufacturing quality caused by burr or erosion which occurs at the time of performing die-casting can be prevented. In addition, mass production is made easier, and a life span of a mold is expanded, so that a manufacturing cost can be reduced.

Further, the second mounting case includes the cooling air introducing portion. Like the blade, a portion corresponding to the circumferential edge of the main body is partially formed into the cooling air introducing portion. The portion includes a slope introducing the flow of cooling air onto the outer surface of the bottom portion. Since the cooling air introducing portion and the slope thereof are formed by processing the circumferential edge of the main body, they are formed by a bending process in the pressing process.

In addition, the cooling air introducing portion to be formed in such a manner acts so as to promote the radiation of the heat of the mounting case. In other words, in the second mounting case, the heat which the electro-optical panel emits is conducted to the mounting case to be radiated from the surface of the mounting case to the outside. Here, if a certain countermeasure is not made, the cooling air to be supplied toward the mounting case causes a whirl air flow in the side portion of the mounting case, so that the flow toward the outer surface of bottom portion is interrupted. On the contrary, in the second mounting case of the invention, the slope of the cooling air introducing portion acts so as to adjust the flow of cooling air. Therefore, the cooling air is guided onto the outer surface of the bottom portion, so that the cooling can be efficiently performed. As a result, hot spots are suppressed from occurring in the electro-optical panel, so that the degradation of the display quality in an electro-optical device and thus an electronic apparatus can be prevented.

Moreover, even in the second mounting case, components other than the main body and the cooling air introducing portion may be added. It is preferable that the other components be formed by a pressing process in terms of manufacturing efficiency. However, when the structure becomes complicated, the components may be molded by die-casting or the like to be bonded to or engaged with the main body or the like.

As described above, in the second mounting case of the invention, at least the main body and the cooling air introducing portion is manufactured by a pressing process, so that the mounting case can be manufactured with a consistent manufacturing quality and at low cost. In other words, the second mounting case of the invention can be implemented by a pressing process, even with a slightly complicated structure because of the cooling air introducing portion. Furthermore, by including the cooling air introducing portion, the second mounting case has a cooling function, which is required for a mounting case, to be sufficiently utilized.

According to a still further aspect of the invention, the slope is formed by folding a portion corresponding to the circumferential edge of the main body toward the main body through a bending process.

According to the aspect, the slope of the cooling air introducing portion is formed by a simple process or a simple construction where a portion corresponding to the circumferential edge of the main body is folded toward the main body, as a part of a pressing process. Accordingly, the second mounting case can be efficiently manufactured.

According to a still further aspect of the invention, at least the main body and the cooling air introducing portion are formed of one plate member.

According to the aspect, a portion constructed by including at least the main body and the cooling air introducing portion in the mounting case is formed of a sheet of plate member subjected to a pressing process. For this reason, a complicated steps for bonding a plurality of plate members is not necessary, so that the mounting case can be efficiently manufactured.

According to a still further aspect of the invention, the second mounting case further includes a heat-radiating blade into which a portion corresponding to the circumferential edge of the main body of the plate member is partially formed by a pressing process and that extends from the main body to the outside of the main body. At least the main body, the cooling air introducing portion, and the blade are formed of one plate member.

According to the aspect, a portion constructed by including at least the main body, the cooling air introducing portion, and the blade in the mounting case is formed of a sheet of plate member subjected to a pressing process. For this reason, a complicated steps for bonding a plurality of plate members is not necessary, so that the mounting case can be efficiently manufactured.

According to a still further aspect of the invention, an electro-optical device includes the mounting case for an electro-optical device of the invention (including the various embodiments); and the electro-optical panel accommodated in the main body.

According to the aspect, the electro-optical panel is accommodated in the mounting case of the invention. For this reason, the mounting case can be manufactured with a consistent quality and at low cost. In addition, with the blade and the cooling air introducing portion being provided, the electro-optical panel can be efficiently cooled, and the degradation of display quality can be prevented.

Moreover, such an electro-optical device include various devices such as a liquid crystal device, an organic EL device, an electrophoresis device such as an electronic paper, a display device using an electron emission element (Field Emission Display and Surface-Conduction Electron-Emitter Display) and the like.

According to a still further aspect of the invention, an electronic apparatus of the invention includes the electro-optical device of the invention.

Since the electronic apparatus of the invention includes the electro-optical device of the invention, the same action and effect as those of the electro-optical device are achieved.

In addition, such an electronic apparatus may include various electronic apparatuses such as a television receiver, a cellular phone, an electronic note, a word processor, a view-finder-type or monitor-direct-view-type video tape recorder, a workstation, a video phone, a point of sale (POS) terminal, a touch panel, which are provided with the electro-optical device.

According to a still further aspect of the invention, a method of manufacturing a first mounting case for an electro-optical device, which is used in an electro-optical device on which a display image is displayed and accommodates an electro-optical panel having an image display region on which the display image is displayed, includes forming a main body that has a plate member formed by a pressing process, a bottom portion opposite to the peripheral region located around the image display region in the electro-optical panel and side portions continuous with the bottom portion to surround the side edge of the electro-optical panel so that the electro-optical device is accommodated therein; and forming a heat-radiating blade into which a portion corresponding to the circumferential edge of the main body of the plate member is partially formed by a pressing process and that extends from the circumferential edge of the main body to the outside of the main body, which is performed at the same time or consecutively with the process of forming a main body.

According to the aspect, a plate member is subjected to a pressing process, so that the main body and the blade in the first mounting case are formed respectively. Here, the formation of the main body or the formation of the blade may simultaneously or consecutively with each other performed. Components other than the main body and the blade may be formed separately or at the same time when the formation of the main body or the formation of the blade is performed. It is preferable that the other components be formed by a pressing process in terms of manufacturing efficiency. However, when the structure is complicated, the components may be molded by die-casting or the like to be bonded to or engaged with the main body or the like.

As such, in the method of manufacturing the first mounting case, the mounting case including the blade as a cooling mechanism can be formed by a pressing process. More specifically, since the method adopts a pressing process in forming the main body and the blade, the deterioration of quality caused by burr or erosion occurring at the time of performing die-casting does not occur in at least the main body and the blade, so that the first mounting case of the invention can be manufactured with a consistent manufacturing quality and at low cost.

According to a still further aspect of the invention, a method of manufacturing a second mounting case for an electro-optical device, which is used in an electro-optical device on which a display image is displayed and accommodates an electro-optical panel having an image display region on which the display image is displayed, includes forming a main body that has a plate member formed by a pressing process, a bottom portion opposite to the peripheral region located around the image display region in the electro-optical panel and side portions continuous with the bottom portion to surround the side edge of the electro-optical panel so that the electro-optical device is accommodated therein; and forming a cooling air introducing portion into which a portion corresponding to the circumferential edge of the main body of the plate member is partially formed by a pressing process and that is formed by a bending process in the pressing process so as to introduce cooling air supplied toward the main body onto the outer surface of the bottom portion, which is performed at the same time or consecutively with the process of forming a main body.

According to the aspect, a plate member is subjected to a pressing process, so that the main body and the cooling air introducing portion in the second mounting case are formed respectively. Here, the forming of main body and the forming of cooling air introducing portion may be performed in a different sequence or at the same time. In addition, components other than the main body and the cooling air introducing portion may be formed by a pressing process or the like, like the method of manufacturing the first mounting case.

As such, in the method of manufacturing the second mounting case, the mounting case including the cooling air introducing portion as a cooling mechanism can be formed by a pressing process. More specifically, since the method adopts a pressing process in forming the main body and the cooling air introducing portion, the deterioration of quality caused by burr or erosion occurring at the time of performing die-casting does not occur in at least the main body and the cooling air introducing portion, so that the second mounting case of the invention can be manufactured with a consistent manufacturing quality and at low cost.

Such actions and other advantages of the invention will be apparent from embodiments which will be described.

BRIEF DESCRIPTION OF THE DRAWINGS

The invention will be described with reference to the accompanying drawings, wherein like numbers reference like elements.

FIG. 6 is a diagram showing the side surface of the electro-optical device, seen from the VI direction of FIG. 5.

FIG. 7 is a diagram showing the side surface of the electro-optical device, seen from the VII direction of FIG. 5.

FIG. 8 is a back view showing the electro-optical device of FIG. 5.

FIG. 23A to FIG. 23F are process diagrams for explaining the method of manufacturing the mounting case according to the embodiment of the invention, which sequentially show the respective processes in the vertical section of the mounting case.

FIG. 27 is a process diagram showing a manufacturing process following the process of FIG. 26.

FIG. 28 is a process diagram showing a manufacturing process following the process of FIG. 27.

DESCRIPTION OF EXEMPLARY EMBODIMENTS

Embodiments of the invention will be described with reference with the drawings.

1: Embodiment of Electronic Apparatus

Figure 1:
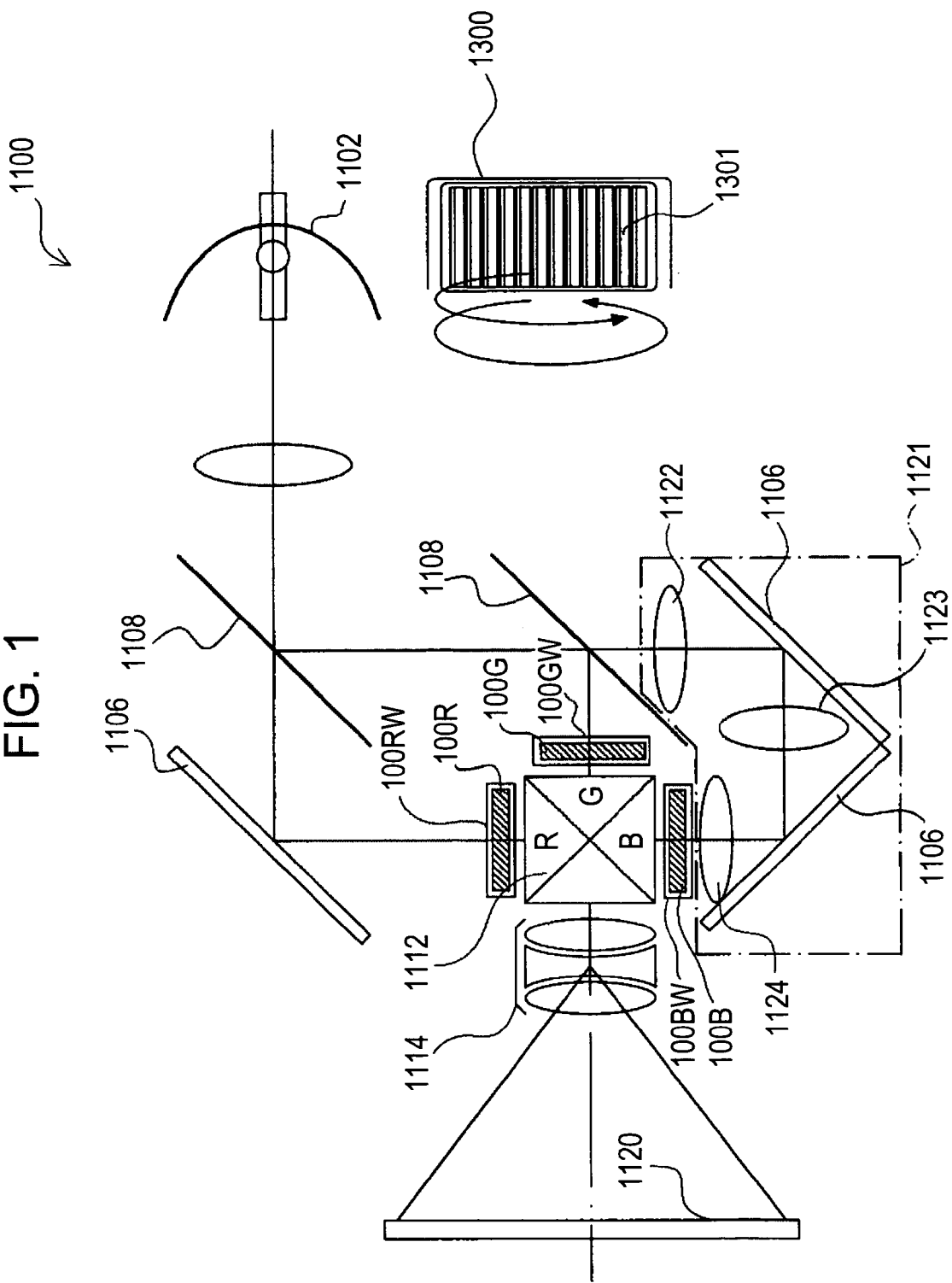
FIG. 1 is a plan view showing an electronic apparatus according to an embodiment of the invention.

First, with reference to FIG. 1, a construction of an electronic apparatus of the present embodiment will be described. FIG. 1 shows a schematic construction of the electronic apparatus according to the present embodiment. Moreover, in the present embodiment, a projection-type liquid crystal projector will be taken as an example of the electronic apparatus according to the invention.

In FIG. 1, a liquid crystal projector 1100 is constructed with a multi-plate type color projector using three liquid crystal light valves 100R, 100G, and 100B for RGB.

In the liquid crystal projector 1100, the projection light emitted from a lamp unit 1102, which is a white light source, such as a metal halide lamp, is divided into R, G, and B light components corresponding to three primary colors including R, G, and B, by three mirrors 1106 and two dichroic mirrors 1108. The light components are guided into the liquid crystal light valves 100R, 100G, and 100B corresponding to the respective colors. In particular, the B light component is guided through a relay lens system 1121 including an incidence lens 1122, a relay lens 1123, and an emitting lens 1124 in order to prevent the loss of light due to the long optical path. The light components corresponding to the three primary colors, which are modulated by the liquid crystal light valves 100R, 100G, and 100B, are again combined by a dichroic prism 1112 and then projected onto the screen 1120 as a color image through a projection lens 1114. In the following descriptions, when the liquid crystal light valves 100R, 100G, and 100B are indicated without any distinction, and are referred to as the liquid crystal light valves 100. In addition, each of the liquid crystal light valves 100R, 100G, and 100B corresponds to a specific example of 'the electro-optical device' according to the invention.

For example, each of the liquid crystal light valves 100 is constructed of an active-matrix driven liquid crystal panel accommodated in a mounting case as described below.

In addition, the liquid crystal projector 1100 is provided with a sirocco fan 1300 to send cooling air to the liquid crystal light valves 100R, 100G, and 100B. The sirocco fan 1300 includes a substantially cylindrical member having a plurality of blades 1301 mounted on the side thereof, and the blades 1301 generate wind by rotating the cylindrical member about its axis. The wind generated by the fan 1300 swirls in a spiral pattern on the basis of this mechanism. The wind is supplied to the respective light valves 100R, 100G, and 100B through an air passage not shown in FIG. 1, and is blown from respective outlets 100RW, 100GW, and 100BW provided near the liquid crystal light valves 100R, 100G, and 100B to the liquid crystal light valves 100R, 100G, and 100B.

In the above-described construction, the respective mounting cases of the liquid crystal light valves 100R, 100G, and 100B are provided on three sides of the dichroic prism 1112. FPCs (flexible printed circuits) connected to the liquid crystal device are drawn from each of the mounting cases. The drawn ends of the FPCs are bent onto the top surface or bottom surface of the dichroic prism 1112 to be connected to external connectors. At this time, if the ends of the FPC are bent tightly, the FPC can be damaged.

In addition, when the liquid crystal projector 1100 is driven, the temperature in the liquid crystal light valve 100 rises due to the light emitted from the lamp unit 1102, which is an intense light source. At this time, an extreme temperature rise may cause degradation of liquid crystal of the liquid crystal light valve 100 or unevenness of transmittance due to hot spots generated by uneven heating of the liquid crystal panel caused by light irregularity of the light source.

Therefore, in the present embodiment, the liquid crystal light valve 100 is constructed as follows, so that the FPC is prevented from being damaged and the rise in temperature is efficiently suppressed.

2: Embodiment of Electro-optical Device

Next, an embodiment according to an electro-optical device according to an embodiment of the invention will be described. The liquid crystal light valve 100, which is an example of 'the electro-optical device' of the embodiment, is constructed of a liquid crystal panel accommodated in a mounting case. Therefore, first, with reference to FIGS. 2 and 3, a specific construction of the liquid crystal panel will be described. Next, with reference to FIGS. 4 to 9, constructions of the mounting case and the liquid crystal light valve 100 and operations thereof will be described. Further, with reference to FIGS. 10 to 24, a method of manufacturing the mounting case will be described.

2-1: Construction of Liquid Crystal Panel

Figure 2:
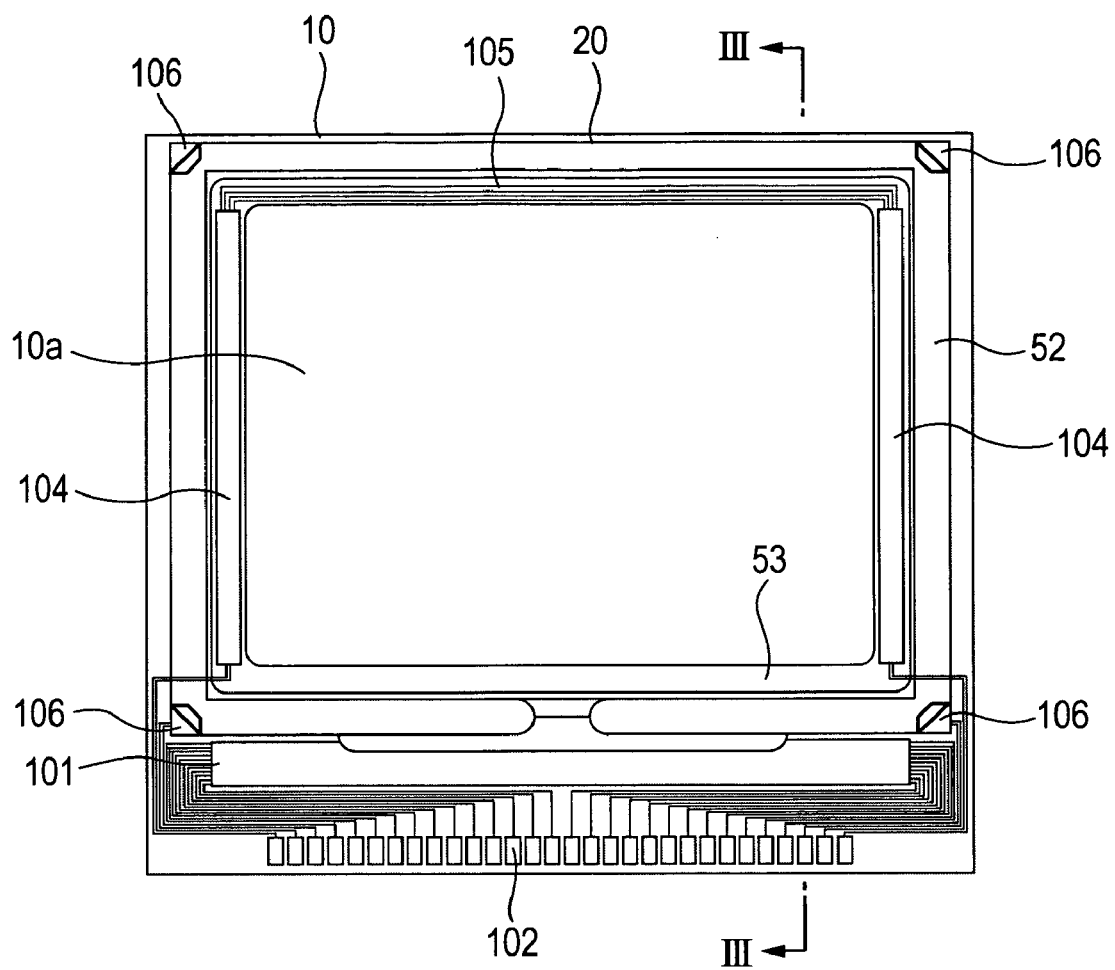
FIG. 2 is a plan view showing an embodiment of an electro-optical device according to the embodiment of the invention.

The liquid crystal panel in the present embodiment, which is a specific example of 'an electro-optical panel' of the invention, uses a built-in type TFT active matrix driving method of a driving circuit. FIG. 2 is a plan view of the liquid crystal panel when a TFT array substrate and constructional components provided thereon are seen from the counter substrate, and FIG. 3 is a cross-sectional view taken along the line III-III of FIG. 2.

Figure 3:
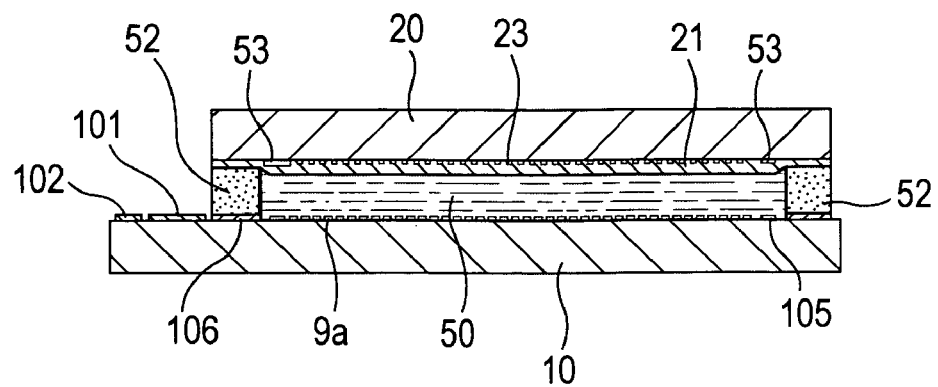
FIG. 3 is a cross-sectional view taken along the line III-III of FIG. 2.

In FIGS. 2 and 3, in the liquid crystal panel, a TFT array substrate 10 and a counter substrate 20 are disposed to face each other. A liquid crystal layer 50 is sealed between the TFT array substrate 10 and the counter substrate 20. The TFT array substrate 10 and the counter substrate 20 are bonded to each other by a sealant 52 provided in a sealing region which is located around an image display region 10a.

The sealant 52 for bonding both substrates is formed of, for example, a ultraviolet curable resin, a thermosetting resin, and the like. The sealant 52 is applied on the TFT array substrate 10 and then cured by means of ultra-violet irradiation or heating in manufacturing processes. In addition, spacer materials such as glass fibers or glass beads are dispersed in the sealant 52 to make a distance between the TFT array substrate 10 and the counter substrate 20 (the gap between the substrates) at predetermined value. That is, the electro-optical device of the present embodiment is suitable for a light valve of the projector with a small size to display enlarged images.

A frame shaped light-shielding film 53 having a light shielding property defines a frame region of the image display region 10a is provided at the counter substrate 20 parallel to the inner side of the sealing region where the sealant 52 is disposed. All or a portion of the frame shaped light-shielding film 53 may be provided on the TFT array substrate 10 as a built-in light-shielding film.

Along one side of the TFT array substrate 10, a data line driving circuit 101 and external circuit connecting terminals 102 are provided in a peripheral region located outside the sealing region where the sealant 52 is disposed among the region extending to the periphery of the image display region. Further, scanning line driving circuits 104 are provided along two sides adjacent to the one side. Moreover, a plurality of wiring lines 105 for connecting the scanning line driving circuits 104 provided at both sides of the image display region 10a are provided at one remaining side of the TFT array substrate 10. In addition, as shown in FIG. 2, upper and lower conductive materials 106 serving as upper and lower conductive terminals between both substrates are disposed at four corners of the counter substrate 20. On the other hand, upper and lower conductive terminals are provided in regions of the TFT array substrate 10 opposite to these corners. Thereby, the TFT array substrate 10 and the counter substrate 20 can be electrically connected to each other.

In FIG. 3, an alignment film is formed on a pixel electrode 9a of the TFT array substrate 10 on which pixel switching TFTs or wiring lines, such as scanning lines and data lines, are formed. On the other hand, a light-shielding film 23 having a matrix shape or stripe shape as well as a counter electrode 21 is formed on the counter substrate 20. In addition, an alignment film is formed on a top layer. Furthermore, the liquid crystal layer 50 is composed of liquid crystal in which a kind or a plurality of kinds of nematic liquid crystal is mixed. A predetermined alignment state is held between a pair of these alignment films.

Further, on the TFT array substrate 10 shown in FIGS. 2 and 3, in addition to the data line driving circuit 101 and the scanning line driving circuits 104, the following circuits may be formed: a sampling circuit that samples image signals on image signal lines to supply these sampled image signals to the data lines, a precharge circuit that supplies precharge signals with a predetermined voltage level to a plurality of data lines prior to the image signals, and an inspection circuit that inspects the quality and defects of the electro-optical device during production or at shipping.

2-2: Construction of Mounting Case and Light Valve

Figure 4:
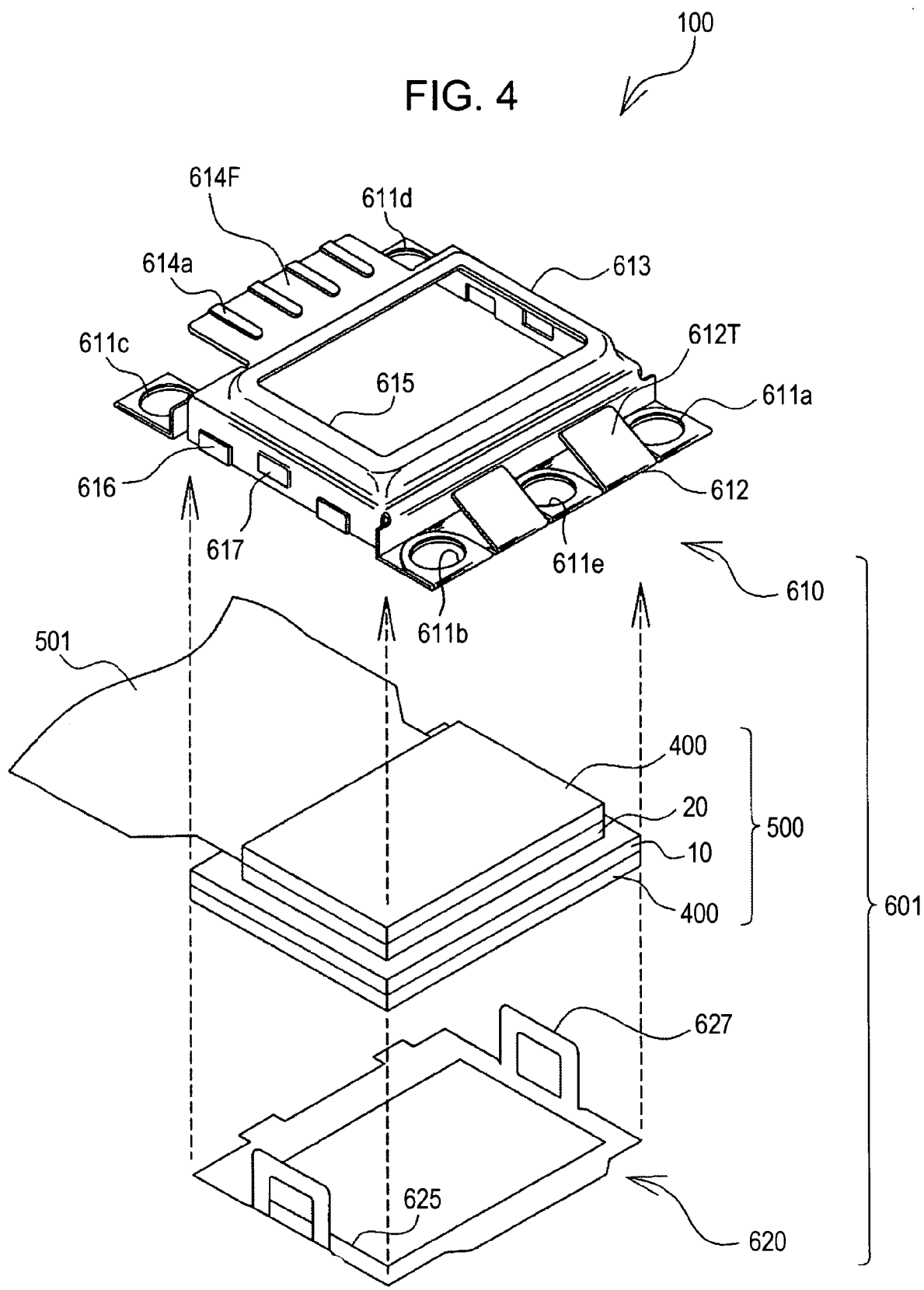
FIG. 4 is an exploded perspective view showing the electro-optical device according to the embodiment.
Figure 5:
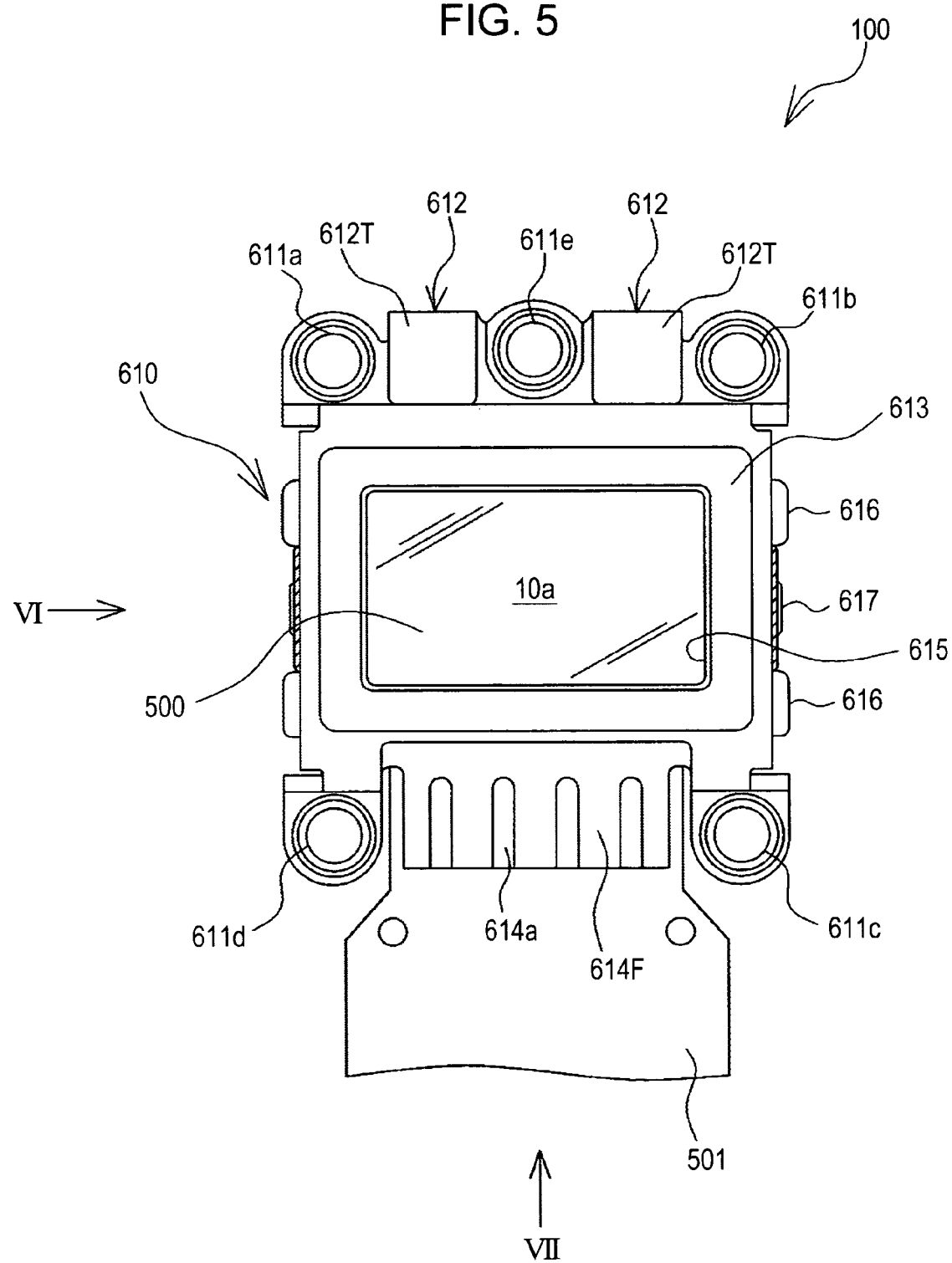
FIG. 5 is a plan view showing the electro-optical device according to the embodiment.

Next, with reference to FIGS. 4 to 8, a specific construction of the mounting case for mounting the liquid crystal panel described above and a specific construction of the liquid crystal light valve having the liquid crystal panel mounted on the mounting case will be described. Here, FIG. 4 is an exploded perspective view illustrating the liquid crystal light valve according to the present embodiment, FIG. 5 is a front view illustrating the liquid crystal light valve, FIG. 6 is a side view, seen from the VI direction of FIG. 5, and FIG. 7 is a side view, seen from the VII direction of FIG. 5. FIG. 8 is a rear view of FIG. 5, seen from the back side.

As shown in FIGS. 4 to 8, the liquid crystal light valve 100 is configured so that the liquid crystal panel 500 is accommodated in the mounting case 601.

In the liquid crystal panel 500, which is formed in the shape shown in FIGS. 2 and 3, a FPC 501 is connected to the external circuit connection terminal 102 (refer to FIGS. 2 and 3). In addition, on the surfaces opposite to the surfaces facing each other with the liquid crystal 50 interposed therebetween in the TFT array substrate 10 and the counter substrate 20, dustproof substrates 400 are provided respectively (refer to FIG. 4). Further, on the outer surface of the liquid crystal panel 500, an optical member such as a reflection preventing plate is attached. However, a polarizer or a retardation film may be attached on the outer surface of the liquid crystal panel 500, but an optical system of the liquid crystal projector 1100 may be provided.

A mounting case 601 includes a frame 610 accommodating the liquid crystal panel 500 and a cover member 620 which is placed over the frame member 610. The cover member 620 is combined with the frame 610, when hooks 627 of both side edges are hanged on claw portions 617 formed on the sides of the frame 610. The liquid crystal panel 500 is accommodated in the direction where the counter substrate 20 faces the frame 610, and the outer surface of the TFT array substrate 10 side is covered by the cover member 620. In other words, in the liquid crystal light valve 100 in the present embodiment, light is incident from the side of the frame 610 to be transmitted through the liquid crystal panel 500, and then, the light is emitted from the side of cover member 620 (In FIG. 1, the dichroic prism 1112 is not opposite to the frame 610, but is opposite to the cover member 620).

The cover member 620 includes a frame-shaped main body with an opened window 625, and the hooks 627 at both sides of the main body. In order to extract the light emitted from the image display region 10a of the liquid crystal panel 500 (refer to FIG. 2), the window 625 is opened so as to face the image display region 10a.

On the other hand, the frame 610 is formed of a plate member such as aluminum-alloy plate, and each portion thereof is formed by a pressing process. It is preferable that the plate member serving as the frame 610 have excellent processibility and a relatively high heat conductivity so as to function as a heat sink with respect to the liquid crystal panel 500. The plate member may be made of, for example, aluminum, copper, or alloy thereof. Here, the frame 610 includes attaching holes 611a to 611e, a cooling air introducing portion 612, and a heat radiating blade 614F in addition to the main body 613 accommodating the liquid crystal panel 500, and the entire frame 610 is formed of one plate member.

The main body 613 is formed so that the inside thereof is hollowed out in accordance with the shape of the liquid crystal panel 500. In other words, the main body 613 is composed of a portion opposing the outer surface of the counter substrate 20 and a portion surrounding the sides thereof. The respective portions correspond to specific examples of 'the bottom portion' and 'the side portion' of the main body in the mounting case of the invention. In particular, a portion of the main body 613, on which light is incident, is continuously formed without any aperture by the drawing process, in order to prevent the stray light from the peripheral region located around the image display region 10a from entering into the image display region 10a. Here, however, since by processing the end portion of the plate member, the blade 614F is formed, a portion of the main body 613, from which light is emitted, is subjected to a bending process, and portions corresponding to four corners of the main body 613 of the plate member are slit.

The main body 613 further includes a window 615, guide portions 616, and the claw portions 617. The window 615 is opened opposite to the image display region 10a, in order to transmit light to the image display region 10a of the accommodated liquid crystal panel 500 (refer to FIG. 2). For this reason, the light emitted from the lamp unit 1102 within the liquid crystal projector 1100 shown in FIG. 1 passes through the window 615 to be incident on the liquid crystal panel 500.

The main body 613 is constructed so that the peripheral region located around the image display region 10a is abutted on the side edge of the window 615, and the heat of the liquid crystal panel 500 can be conducted to the frame 610 so as to be radiated outside.

The guide portion 616 and the claw portion 617 are formed by a pressing process so that the side portion of the main body 613 is partially irregular. The claw portion 617 is used to hang the hook 627 as described above and is formed in the position corresponding to the hook 627, for example, by the cutting and raising process. The guide portions 616 are formed in both sides of the claw portion 617, for example, by a drawing process and functions as a groove where the step at the claw portion 617 guides the hook 627 to the claw portion 617.

In the pressing process, however, if a projecting portion is formed on the outer surface of the plate material, a recess having the same shape is formed on the rear surface thereof. Therefore, in the present embodiment, the recess to be formed on the rear surface when the guide portion 616 is formed serves as an adhesive reservoir 616a. The adhesive reservoir 616a is provided to retain an adhesive, when the liquid crystal panel 500 is fixed by the adhesive inside the frame 610.

As such, in the main body 613, the attaching holes 611a to 611e, the cooling air introducing portion 612, and the blade 614F are formed on an extension of the portion where the guide portion 616 and the claw portion 617 are not formed.

Each of the attaching holes 611a to 611e is formed to penetrate through a pedestal where a portion corresponding to the peripheral edge of the main body 613 of the plate material is partially folded by a pressing process. The attaching holes 611a to 611e are used when the corresponding light valve 100 is attached in the liquid crystal projector 1100 as shown in FIG. 1. Among them, the attaching holes 611a to 611d are provided in the four corners of the frame 610. Further, the remaining attaching hole 611e is provided the frame 610. The attaching hole 611e and the attaching holes 611c and 611d are disposed so as to shape a triangle. As a result, the liquid crystal light valve 100 can use the four-point fixing by using the attaching holes 611a to 611d formed at the four corners, or the three-point fixing by using the attaching holes 611e, 611c, and 611d.

The cooling air introducing portion 612 has a slope 612T where a portion corresponding to the peripheral edge of the main body 613 of the plate material is partially press-processed. As shown in FIGS. 4 and 6, the slope 612T is formed by folding the peripheral edge of the main body 613 at an arbitrary angle toward the main body 613 by a bending process. The slope 612T adjust the direction of the cooling air to be supplied toward the frame 610 and acts so as to guide the cooling air onto the surface with the opened window 615, as described below. Moreover, the cooling air introducing portion 612 and the blade 614F are formed at opposing sides on the surface with the opened window 615.

The blade 614F is formed so that a portion corresponding to the peripheral edge of the main body 613 of the plate member is partially press-processed to extend toward the outside of the main body 613. The blade 614F functions as a so-called heat radiating fin by which the heat conducted from the liquid crystal panel 500 to the frame 610 is radiated to the outside air. Here, as shown in FIG. 5, a plurality of linear steps 614a are arranged parallel to each other by a half punching process. The steps 614a increase the surface area of the blade 614F or the frame 610 and act so as to enhance the heat radiation effect.

As shown in FIG. 7, in the liquid crystal light valve 100, the other end of the FPC 501 of which one end is connected to the liquid crystal panel 500 is led from an opening 614 to the outside of the mounting case 601. In the present embodiment, the opening 614 is defined in the position corresponding to a portion formed as the blade 614F in the peripheral edge of the main body 613. In other words, when a portion along one side of the bottom portion in the peripheral edge of the main body 613 is formed as the blade 614F, an opening which is formed in the region occupied by the portion is used as the opening 614. As such, at the same time when the opening formed in the portion formed as the blade 614F is arranged, the opening for drawing out the FPC 501 is provided. Such a simplified structure is suitable for a pressing process and contributes to simplifying the manufacturing process.

2-3: Operation of Liquid Crystal Light Valve

Figure 9:
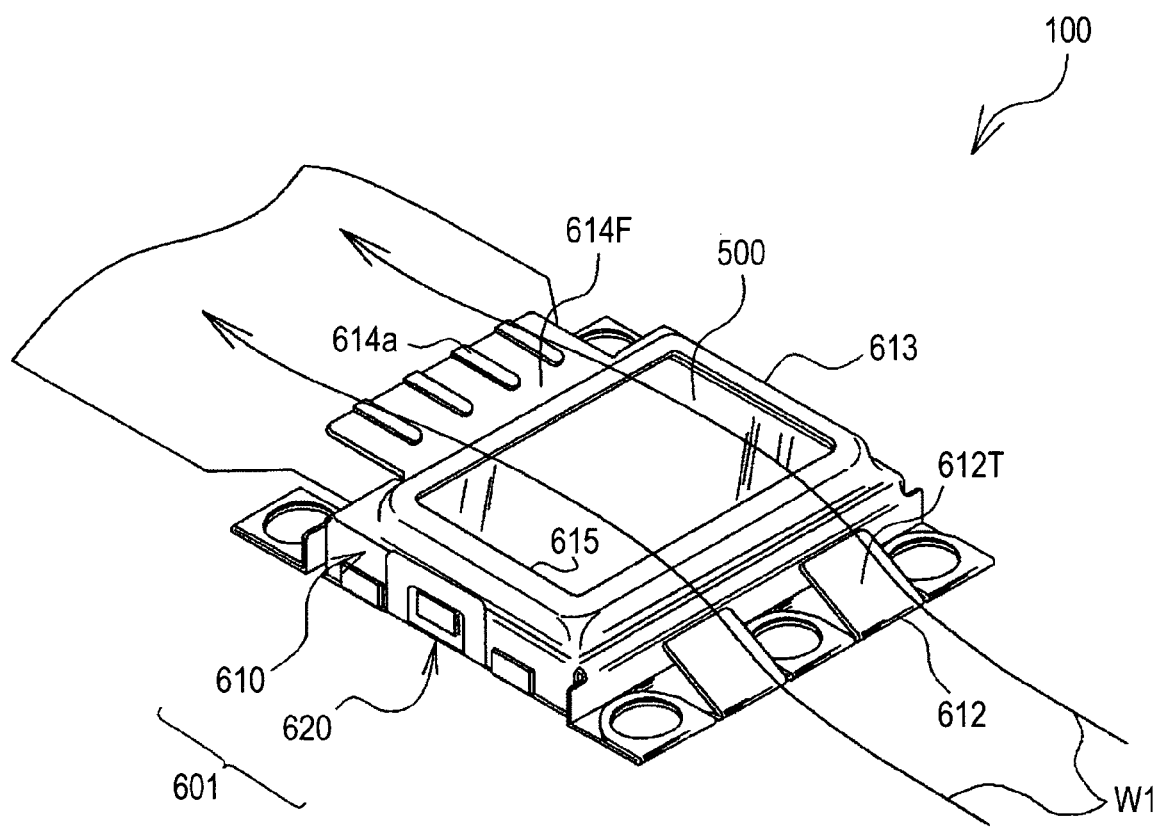
FIG. 9 is a perspective view showing the electro-optical device according to the embodiment and is also a diagram showing a typical direction of cooling air with respect to the corresponding electro-optical device.

Next, an operation of the liquid crystal light valve as described above will be described with reference to FIG. 9. FIG. 9 shows a typical flow direction of cooling air with respect to the liquid crystal light valve according to the present embodiment.

In the liquid crystal projector 1100 as shown in FIG. 1, a cooling air sent from the sirocco fan 1300 toward the liquid crystal light valve 100 flows onto the outer surface of the mounting case 601, as shown in FIG. 9. Moreover, in order to implement such a flow of cooling air, the liquid crystal light valves 100R, 100G, and 100B need to be disposed so that the outlets 100RW, 100GW, and 100BW shown in FIG. 1 oppose the cooling air introducing portion 612 of the mounting case 601.

In FIG. 9, on the outer surface of the mounting case 601, a flow of cooling air W1 is generated, which is adjusted by the slope 612T to be guided to the main body 613 as if the cooling air W1 runs up the slope 612T. The cooling air W1 draws heat of the liquid crystal panel 500 from the exposed surface in the window 615. In other words, by providing the cooling air introducing portion 612 in the liquid crystal light valve 100, the cooling air W1 is efficiently delivered toward the main body 613 and the liquid crystal 500 is effectively cooled.

Here, the cooling air W1 flows toward the blade 614F which is disposed to oppose the cooling air introducing portion 612 to be placed under the cooling air. For this reason, the blade 614F and thus the frame 610 are cooled by the cooling air W1. As such, if the blade 614F and the frame 610 are efficiently cooled, heat to be conducted from the liquid crystal panel 500 is very efficiently radiated to the outside of the mounting case 601. In other words, the blade 614F promotes the radiation of the heat conducted to the frame 610, and the steps 614a, which are formed on the surface to expand the surface area of the blade 614F, act so as to enhance the radiation effect. Here, the extending direction of the steps 614a substantially coincides with the direction of the cooling air W1, so that the steps 614a also contribute to create the flow of cooling air W1.

In general, various cooling mechanisms such as a cooling air introducing slope and a blade having such a cooling function are implemented in a mounting case molded by die-casting. However, when a mounting case is formed by a pressing process like the mounting case 601, a further constructional device is further necessary, because there is a design limitation in that a pressing process must be able to be performed. Here, since a portion corresponding to the peripheral edge of the main body 614 is partially deformed to form the cooling air introducing portion 612 and the blade 614F, the cooling efficiency of the mounting case 601 is improved.

Moreover, at the time of such an operation, the liquid crystal light valve 100 performs display by use of the light emitted from the side of the frame 610. However, a portion of the bottom portion to the side portion of the frame 610, with which the image display region 10a is edged, is formed with a curved surface continuous with a plate member by a drawing process. Therefore, stray light from an aperture formed in the frame 610 is previously prevented from entering into the image display region 10a, so that an excellent display quality can be maintained.

2-4: Method of Manufacturing Mounting Case

Next, the mounting case 601 and, more particularly, a method of manufacturing the frame 610 will be described with reference to FIGS. 10 to 24. FIGS. 10 to 21 are plan views and cross-sectional views showing processes of manufacturing the frame 610, respectively. As the cross-sectional views, a vertical sectional view and a horizontal sectional view, which pass through the centers of the plan views, are disposed parallel to the corresponding cross-sectional surfaces, respectively. In these cross-sectional views, components are properly omitted and added so that the processes may be easily understood. In addition, FIGS. 22A to 22F show a series of manufacturing processes, seen from the horizontal sectional surface. FIGS. 23A to 23F and FIGS. 24A to 24E show a series of manufacturing processes, seen from the vertical sectional surface.

Figure 10:
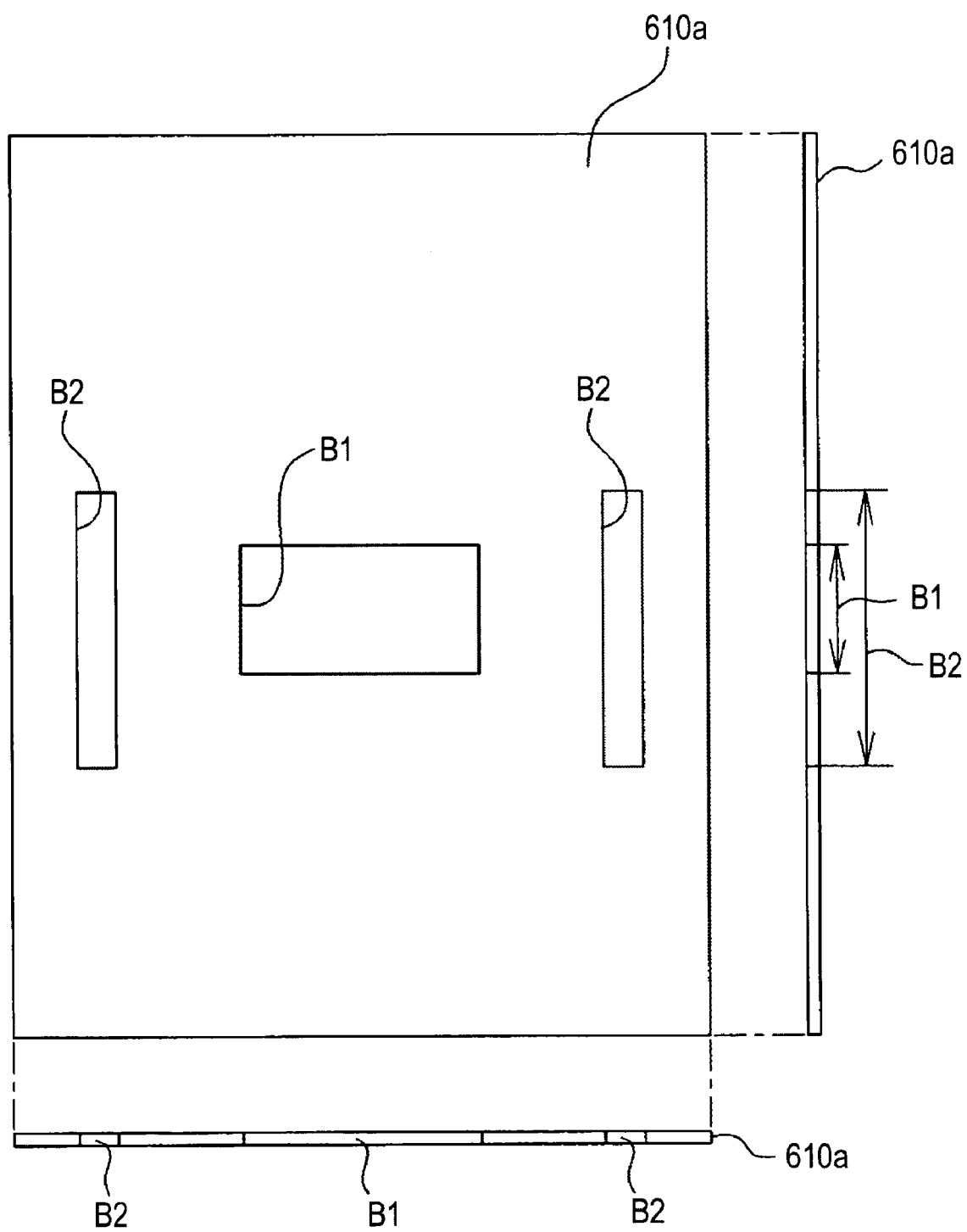
FIG. 10 is a process diagram for explaining a method of manufacturing a mounting case according to an embodiment.

First, in the process of FIG. 10, blank shapes B1 and B2 are cut out by a laser beam machine in the center and both sides of the plate member 610a made of aluminum alloy or the like, respectively.

Figure 11:
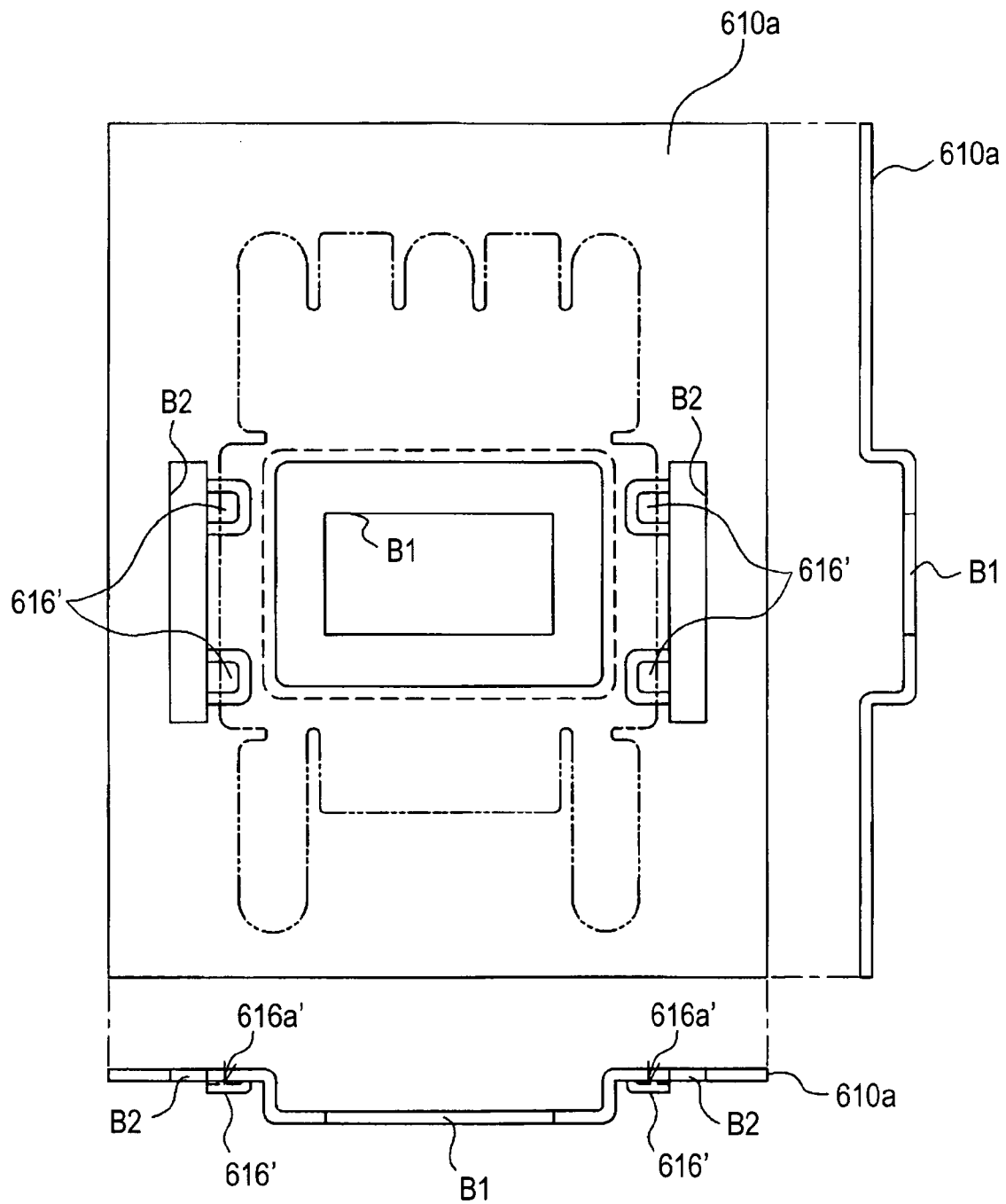
FIG. 11 is a process diagram showing a manufacturing process following the process of FIG. 10.

Next, in the process of FIG. 11, the bottom surface of the main body 613 is formed by a drawing process in a portion centered on the blank B1 of the plate member 610a, and the guide portions 616' and the adhesive reservoir 616a' are formed in the end of the blank B2 closer to the blank B1. In other words, the bottom portion of the main body 613 is formed with a curved surface continuous to the side portion in the plate member 610a.

Since the guide portion 616' and the adhesive reservoir 616a' are rear and top sides of concave and convex portion formed on the plate member 610a, the plate member 610a is cut out in a predetermined contour shape, so that the guide potion 616 and the adhesive reservoir 616a' are formed. Moreover, in the drawing processing here, the plate member 610a is partially formed by a drawing machine by using a mold corresponding to the shape of the bottom surface of the main body 613 and the guide portion 616' or the adhesive reservoir 616a'.

If a projecting portion is formed on the outer surface of the plate member 610a like the guide portion 616', a recess is formed on the rear surface thereof. Here, the recess formed on the back side of the guide portion 616' serves as the adhesive reservoir 616a'. Accordingly, in the present embodiment, the guide portion 616 and the adhesive reservoir 616a can be efficiently formed by a pressing process.

Figure 12:
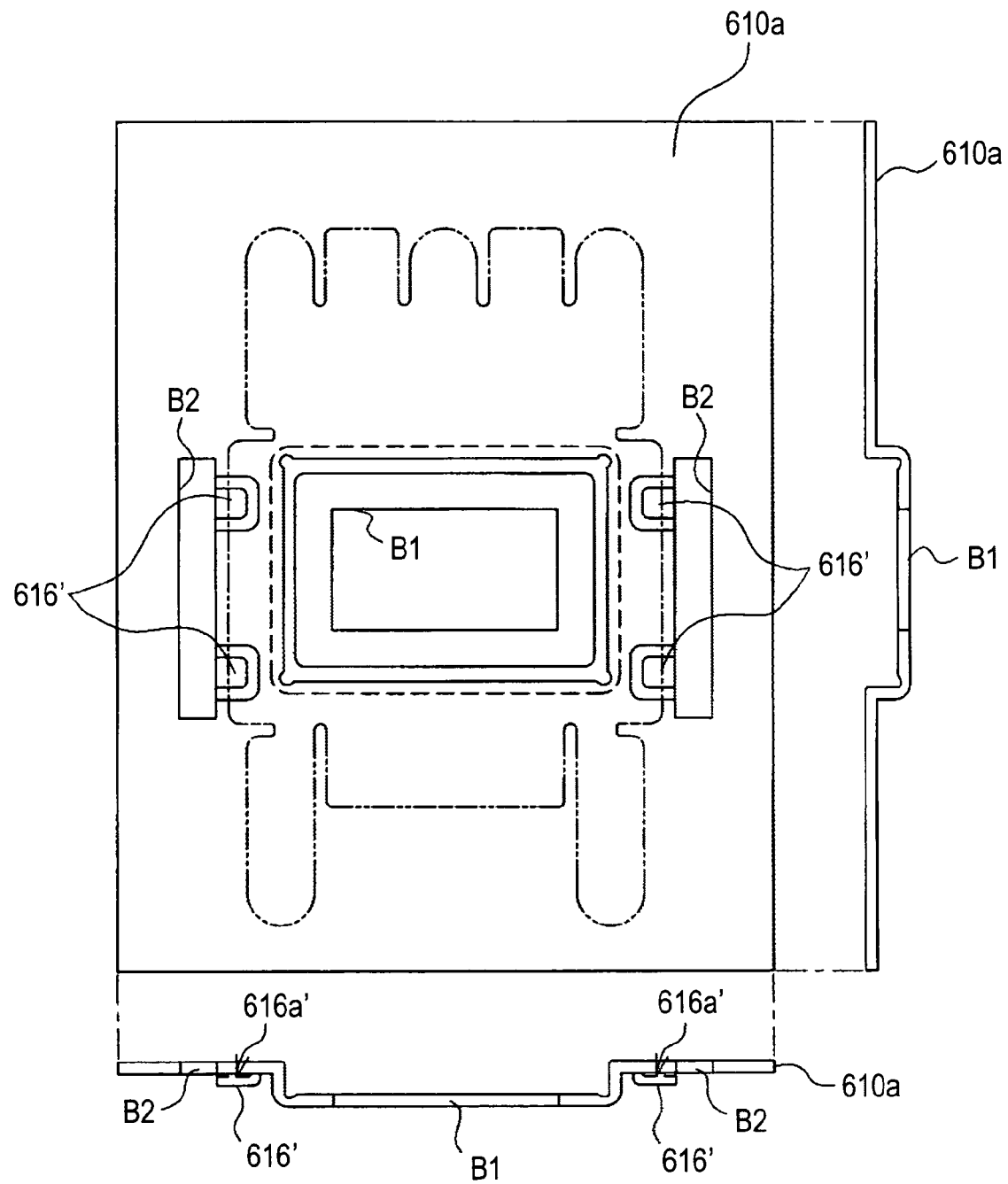
FIG. 12 is a process diagram showing a manufacturing process following the process of FIG. 11.

Next, in the process of FIG. 12, 'the corner mounting' is performed with respect to four corners of the bottom surface of the main body 613 by a drawing process. 'The corner rounding' indicates that the corner bent in a drawing process of FIG. 11 is rounded to be more clearly angulated in the plate member 610a. By producing the corner in such a manner, the liquid crystal panel 500 can be exactly fitted into the portion.

Figure 13:
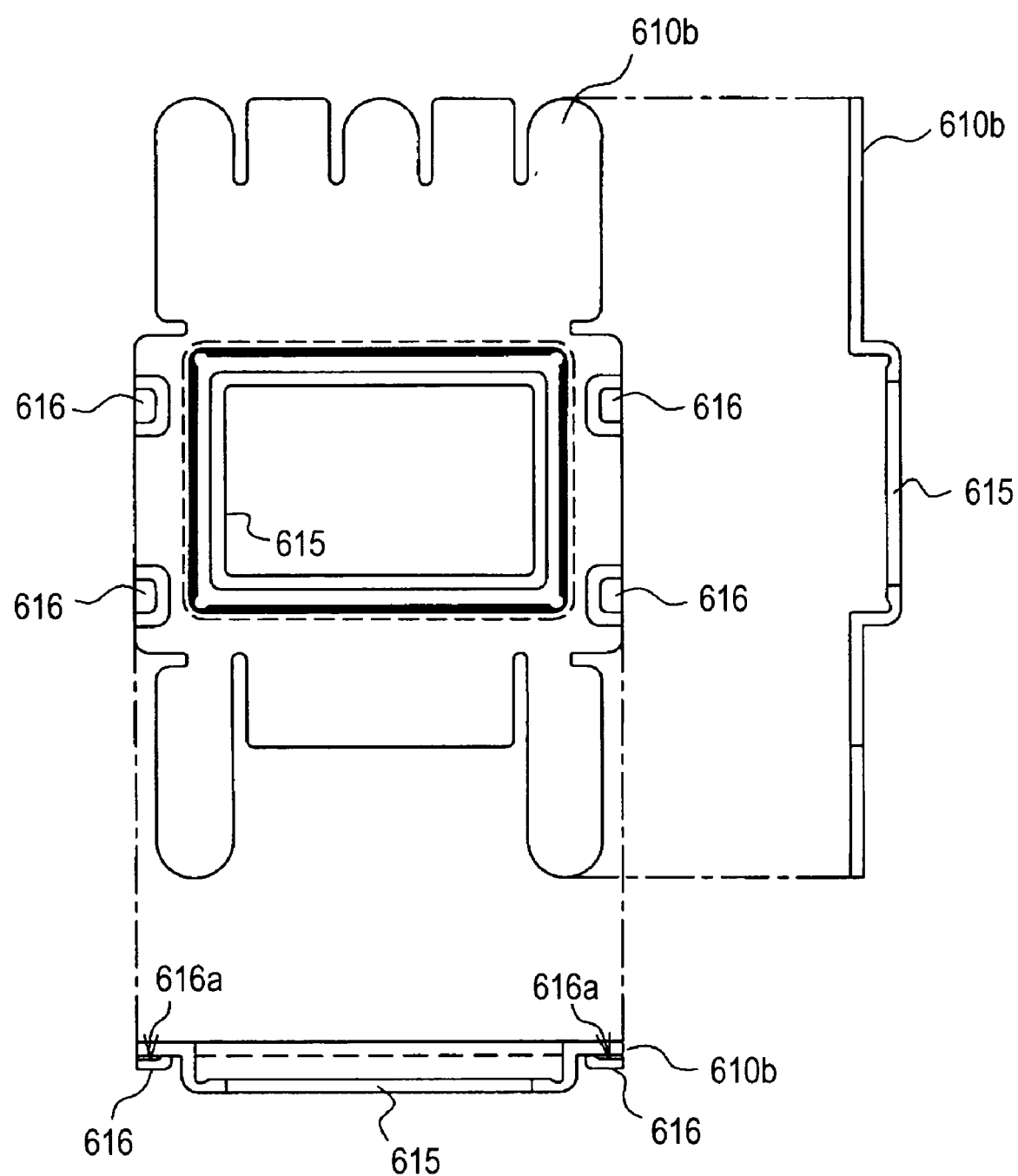
FIG. 13 is a process diagram showing a manufacturing process following the process of FIG. 12.

Next, in the process of FIG. 13, an unnecessary portion at the periphery of the plate member 610a is cut off by a laser beam machine, so that a plate member 610a having a predetermined contour shape is clipped. At this time, sections which are the guide portion 616 and the adhesive reservoir 616a remain on the both sides of the bottom surface of the main body 613. Further, the blank B1 is opened so as to further expand so that the window 615 is formed. After that, the rim, if necessary, is manually performed at the circumferential edge of the plate member 610b.

Figure 14:
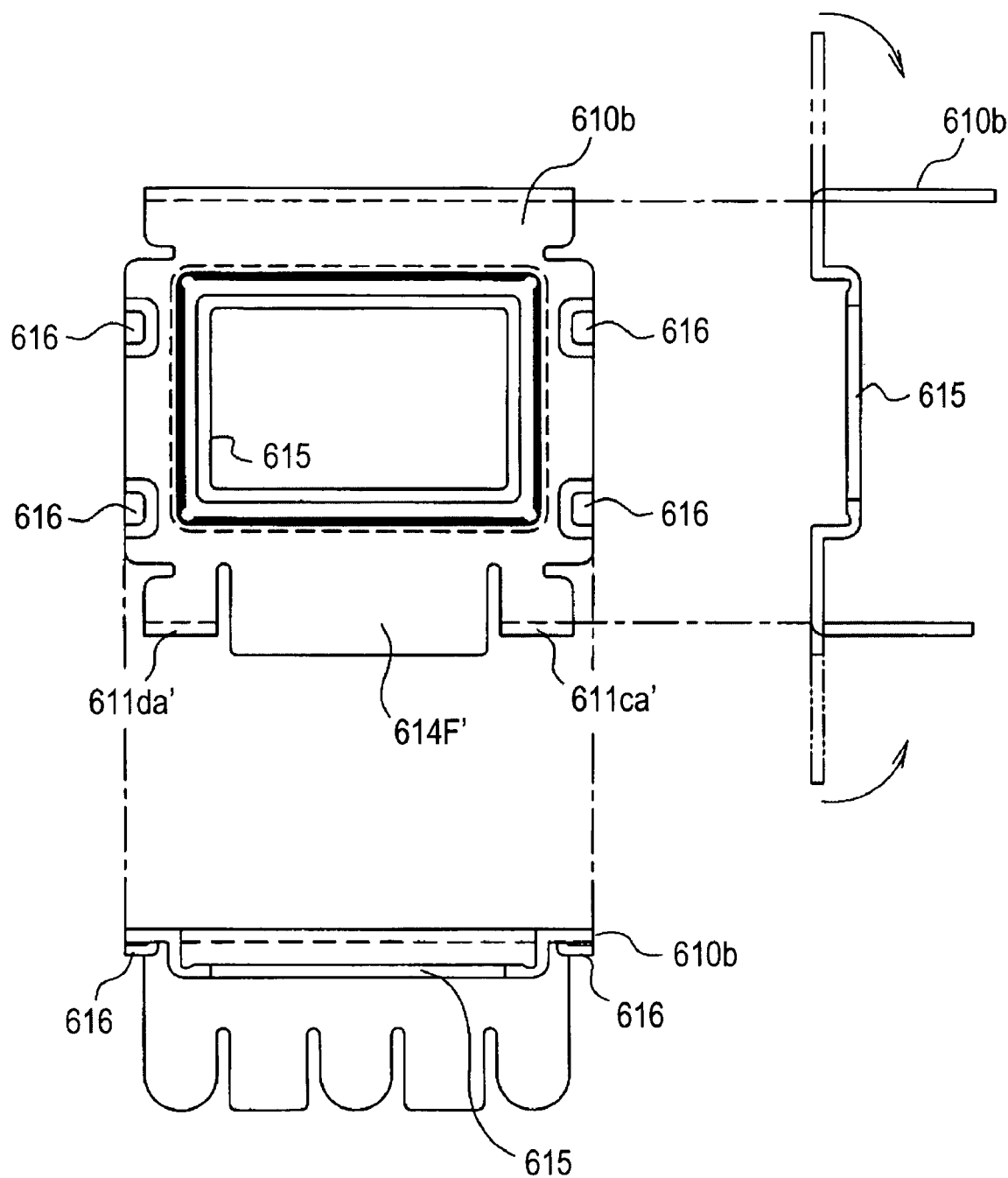
FIG. 14 is a process diagram showing a manufacturing process following the process of FIG. 13.

Next, in the process of FIG. 14, the plate member 610b is bent by a bender. In other words, in the plate member 610b, the upper and lower end portions in the plan view of FIG. 14, i.e. the portions corresponding to the circumferential edges of the main body 613 are bent substantially vertically to the bottom surface of the main body 613 (to the arrow direction in the vertical sectional view of FIG. 14). At this time, in the lower end portion, hole forming portions 611ca' and 611da' where the attaching holes 611c and 611d are respectively formed are bent, but a blade forming portion 614F' serving as the blade 614F remains as it is without being bent.

Figure 15:
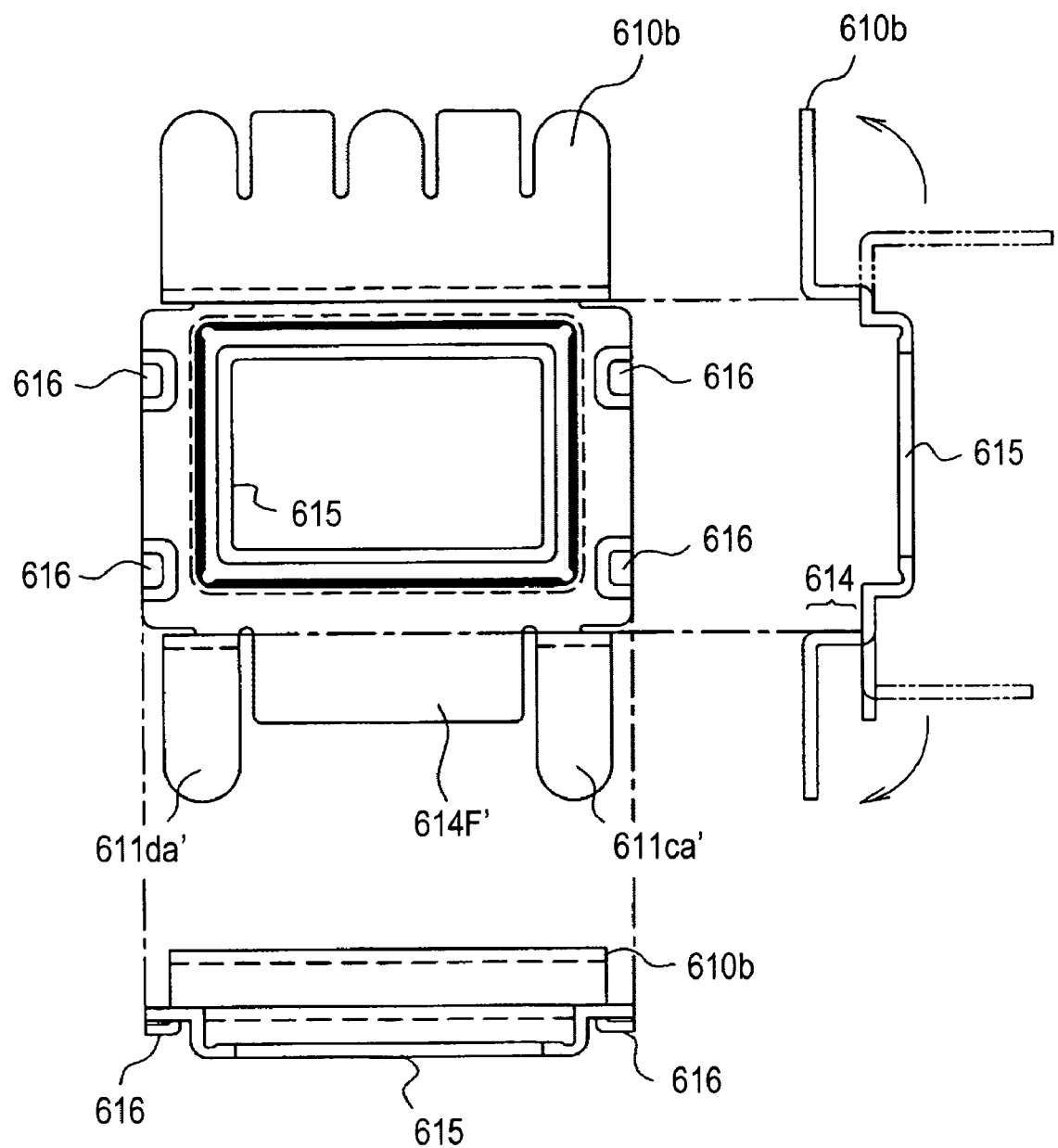
FIG. 15 is a process diagram showing a manufacturing process following the process of FIG. 14.

Further, in the process of FIG. 15, the plate member 610b is bent one more time. At this time, in a more inner position than that in the previous process, the upper and lower end portions of the plate member 610b in the plan view of FIG. 15 are folded substantially vertically to the bottom surface of the main body 613 (to the arrow direction in the vertical sectional view of FIG. 15). As a result, in the bottom portion to the side portion of the main body 613, steps corresponding to the contour of the liquid crystal panel 500 are formed. Moreover, in the present embodiment, the blade forming portion 614F' becomes one step lower than the portion folded in this process, i.e. the portion corresponding to the peripheral edge of the main body 613, so that the opening 614 is automatically formed. In other words, with the frame 610 being designed to have this structure, the opening 614 for leading the blade 614F and the FPC 501 to the outside of the mounting case 601 can be efficiently formed.

Figure 16:
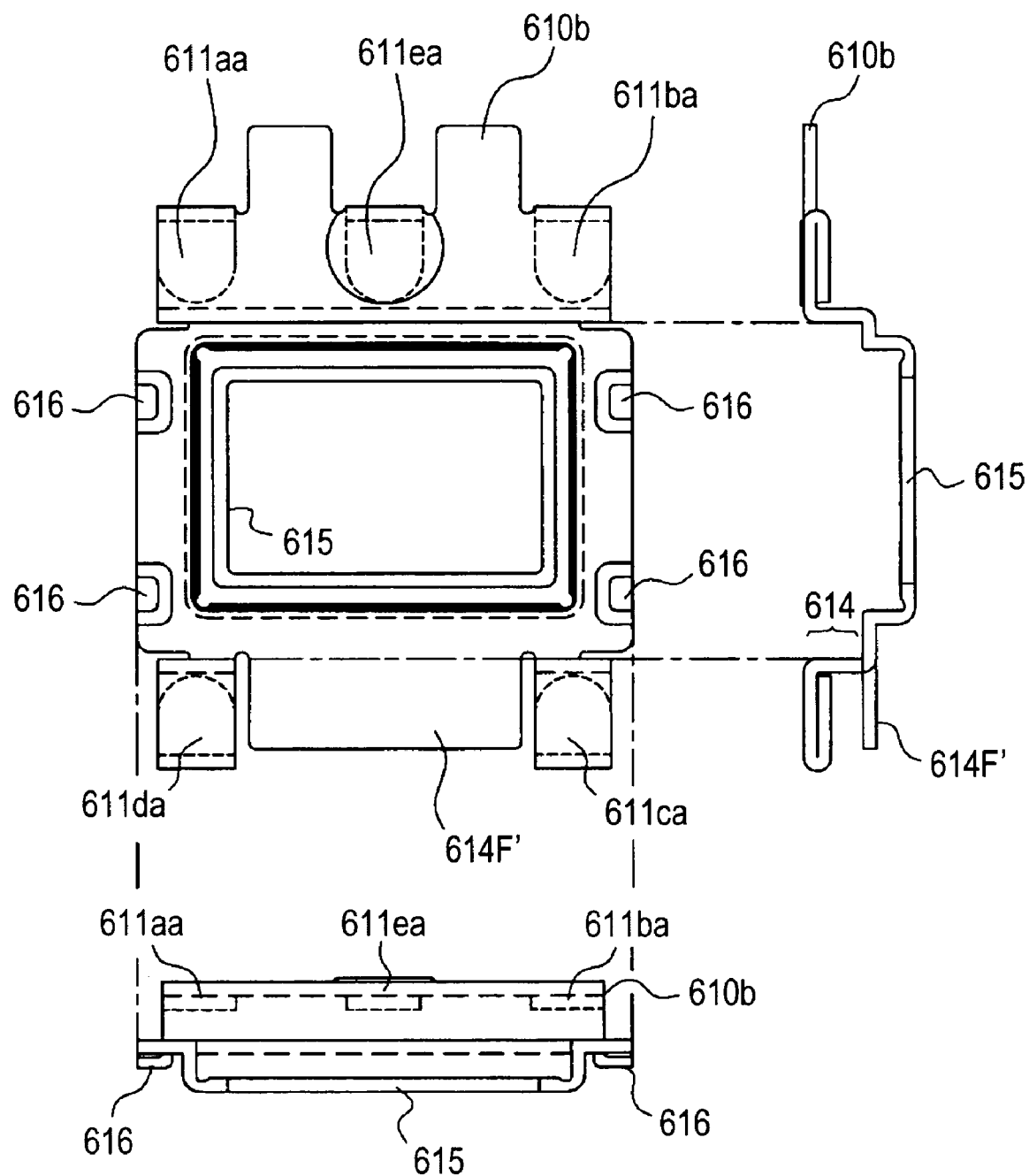
FIG. 16 is a process diagram showing a manufacturing process following the process of FIG. 15.

Next, the process of FIG. 16, predetermined portions on the plate member 610b and lower hole forming portions 611ca' and 611da' below the plate member 610b in the plan view are folded at 180 degrees, so that pedestal portions 611aa to 611ea are formed.

Figure 17:
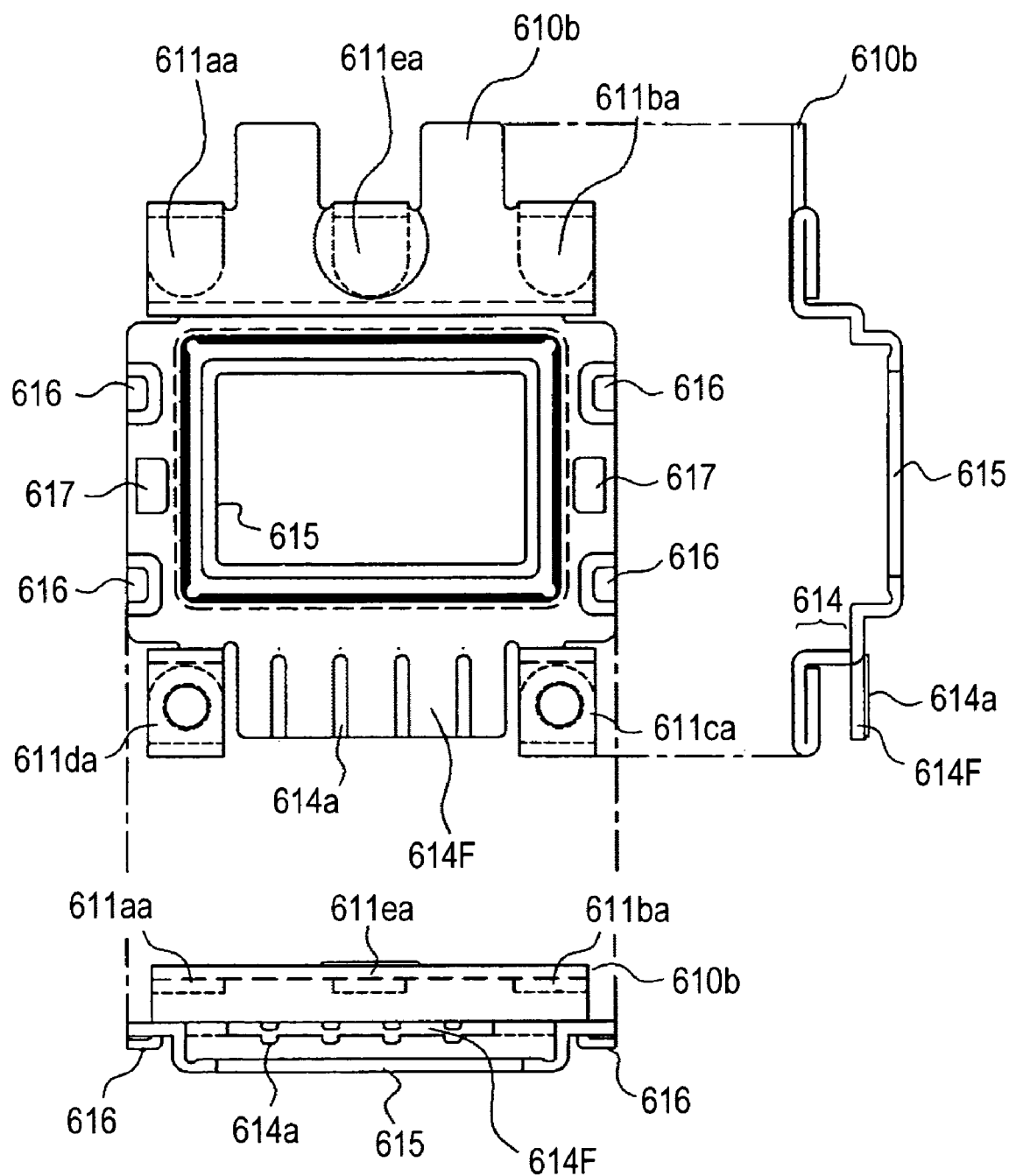
FIG. 17 is a process diagram showing a manufacturing process following the process of FIG. 16.

Next, in the process of FIG. 17, the claw portions 617, of which each is interposed by the guide portions 616, are formed on both side edges of the plate member 610b in the plan view by the cutting and raising process, and two kinds of half blanking processes (the so-called half punching process) are performed as below. One is a round half blanking process, by which circles are marked on the pedestal portions 611ca, 611da, and 611ea. On the pedestal portions 611ca and 611da, circles having smaller diameter than the attaching holes 611c and 611d are marked. On the pedestal portion 611ea, a circle having larger diameter than the attaching hole 611e is marked. The other is two-step half blanking process, by which line-shaped steps 614a are formed on both surfaces of the blade forming portion 614F' to form the blade 614F, as shown in FIG. 17.

Figure 18:
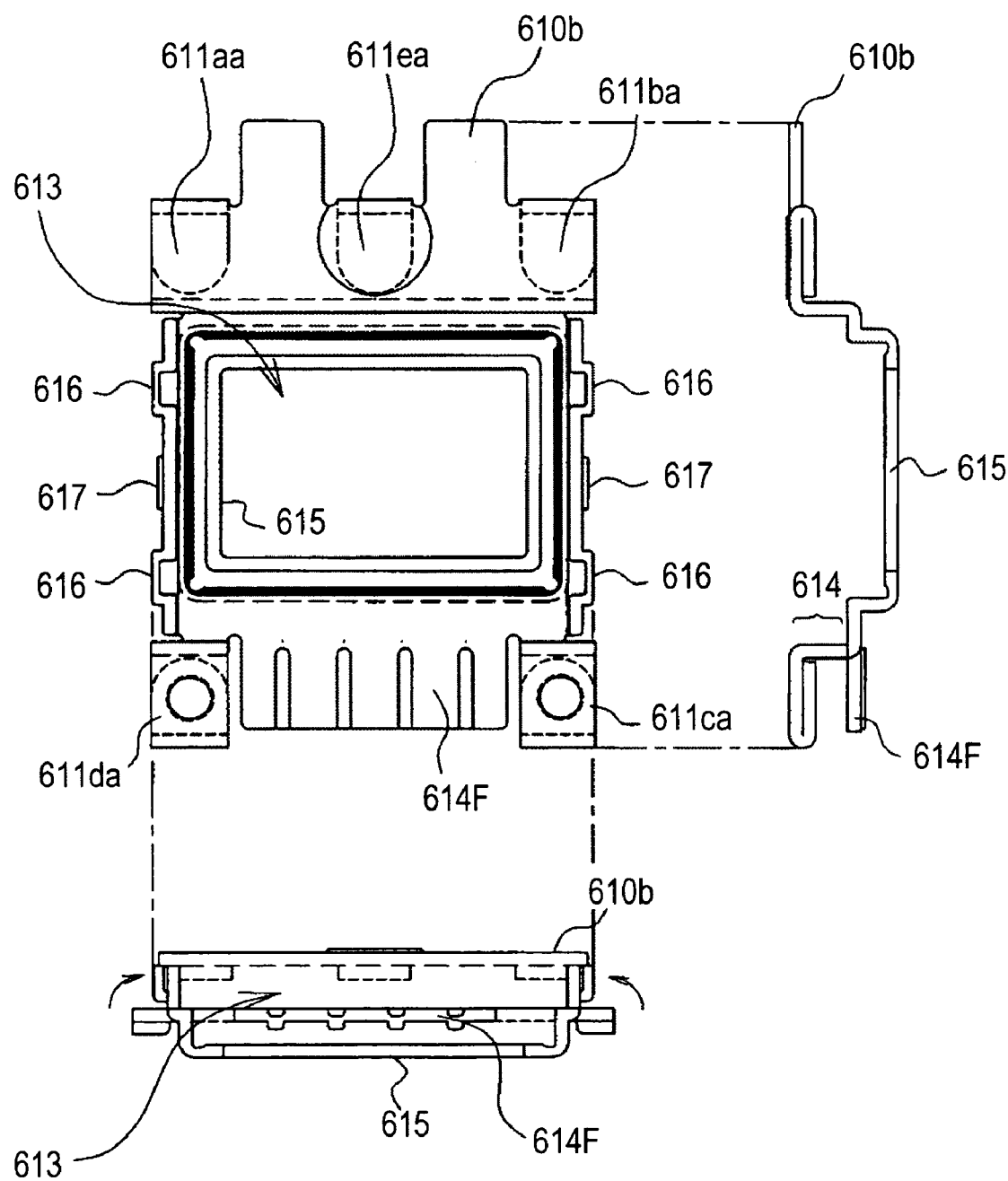
FIG. 18 is a process diagram showing a manufacturing process following the process of FIG. 17.

Next, in the process of FIG. 18, the plate member 610b is bent by using a mold. In other words, both side edges of the plate member 610b in the plan view of FIG. 18 are bent so as to be erected from the bottom portion like the upper and lower end portions in the same plan view (that is, to the arrow direction in the horizontal sectional view of FIG. 18). As a result, the portions bent in this process and the upper and lower end portions bent with double layers become a side portion surrounding the bottom portion, so that the main body 613 is formed.

Figure 19:
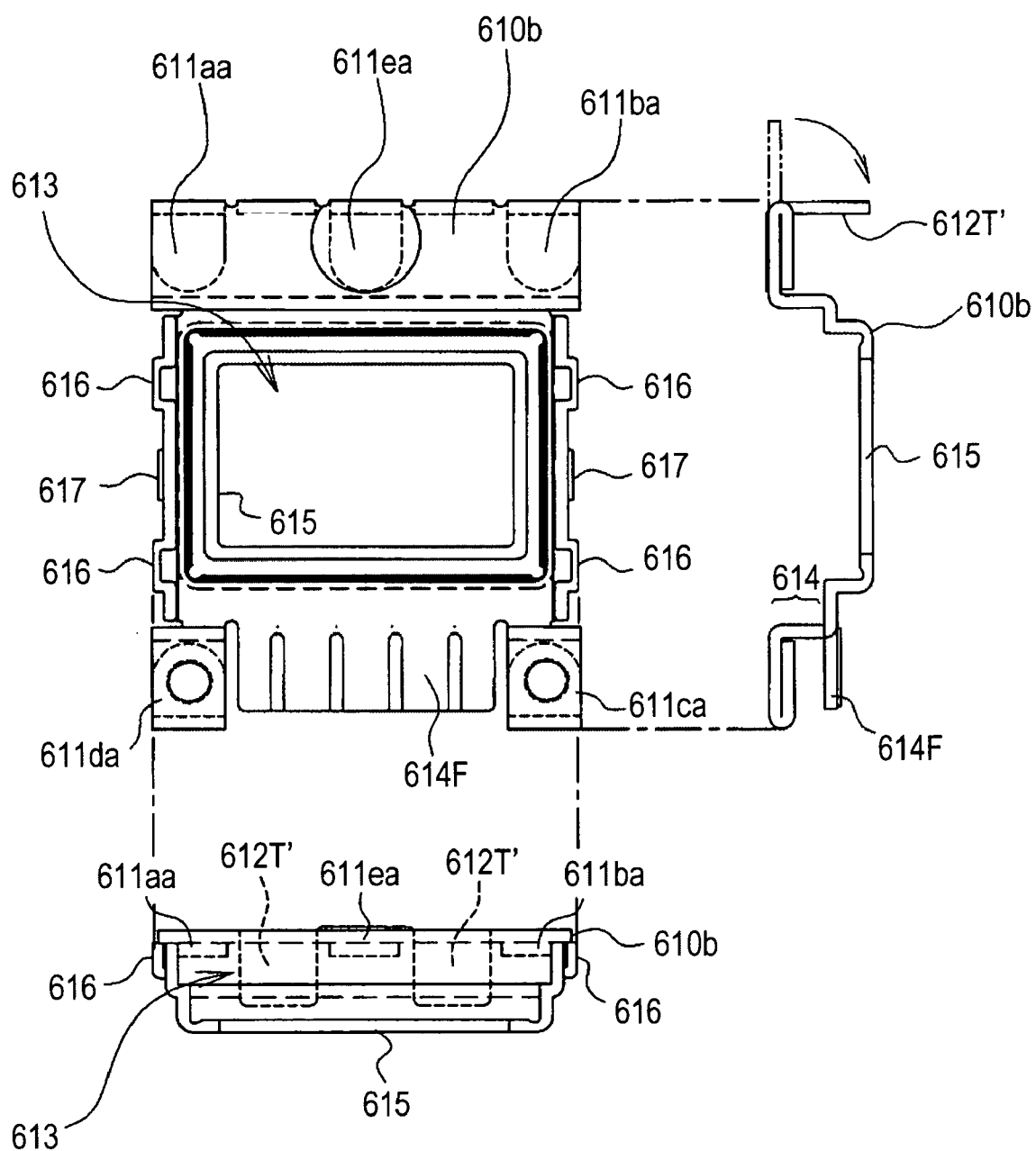
FIG. 19 is a process diagram showing a manufacturing process following the process of FIG. 18.

Next, in the process of FIG. 19, the plate member 610b is bent by a bender. In other words, in the plate member 610b, slope forming portions 612T', which extend between the pedestal portions 611aa and 611ea and between the pedestal portion 611ea and 611ba, are bent substantially vertically to the bottom surface of the main body 613 (to the arrow direction in the vertical sectional view of FIG. 19).

Figure 20:
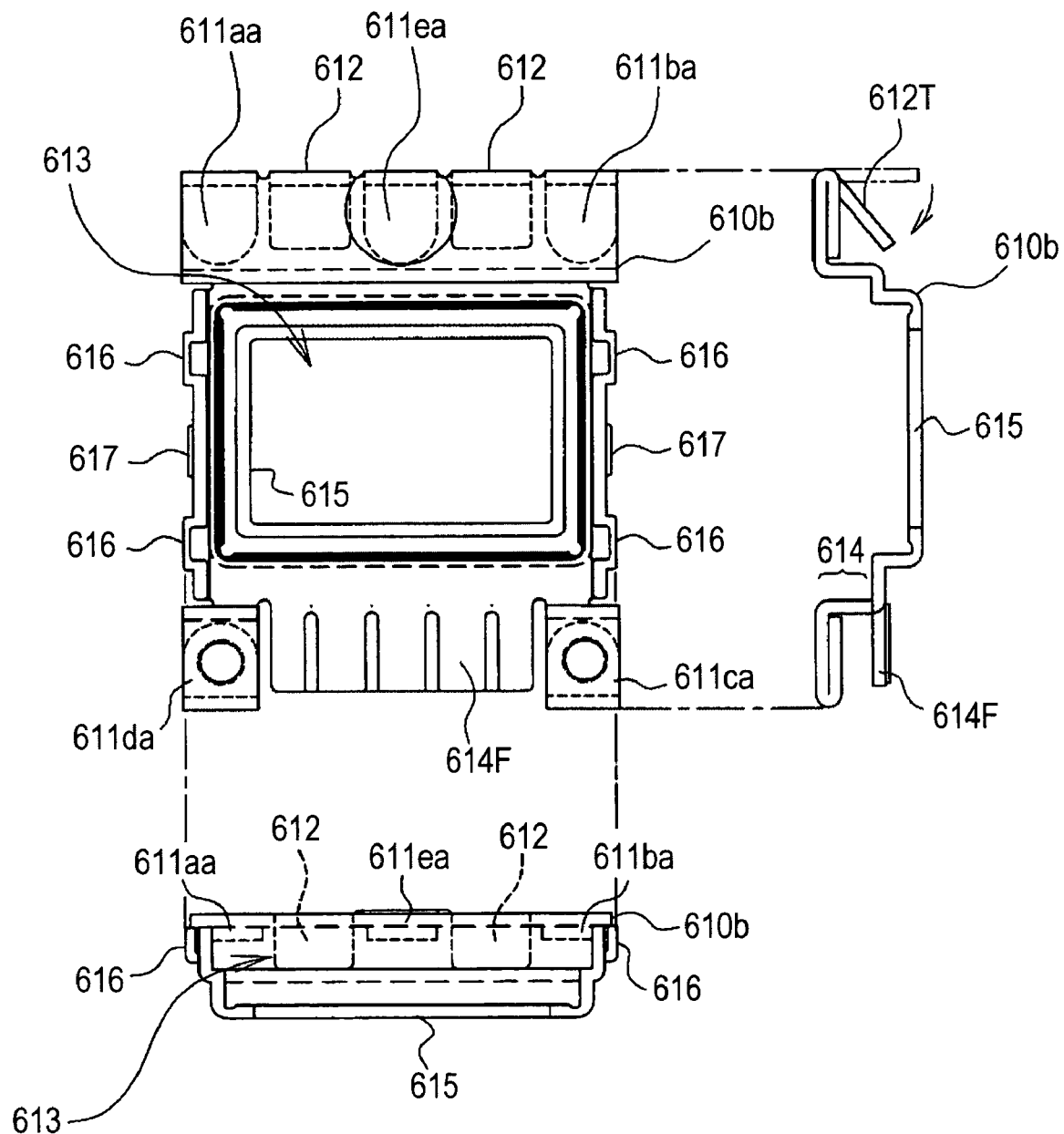
FIG. 20 is a process diagram showing a manufacturing process following the process of FIG. 19.

Subsequently, in the process of FIG. 20, the slope forming portion 612T' are further bent by a bender. In the present process, the slope forming portion 612T' are bent approximately at 45 degrees in the arrow direction in the vertical sectional view of FIG. 20. As a result, the outer surface of the slope forming portion 612T' becomes the slope 612T. As such, the cooling air introducing portions 612 having the slope 612T are formed between the pedestal portions 611aa and 611ea and between the pedestal portions 611ea and 611ba, respectively.

Figure 21:
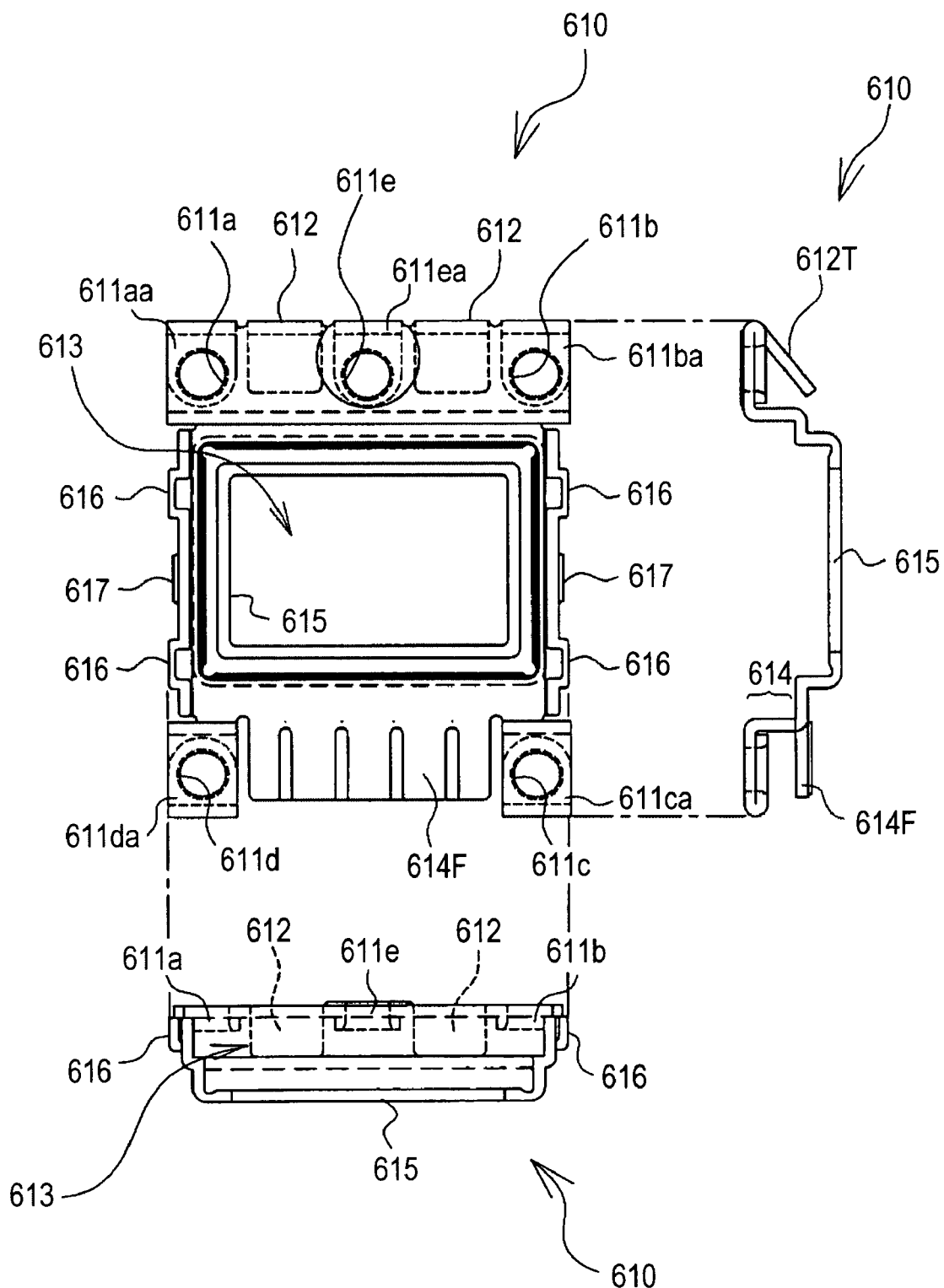
FIG. 21 is a process diagram showing a manufacturing process following the process of FIG. 20.
Figure 22A:
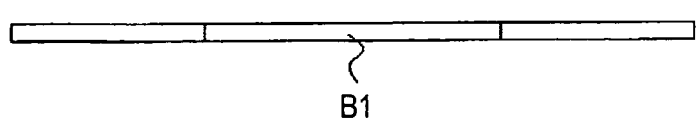
FIG. 22A to FIG. 22F are process diagrams for explaining a method of manufacturing the mounting case according to the embodiment, which sequentially show the respective processes in the horizontal section of the mounting case.
Figure 22B:
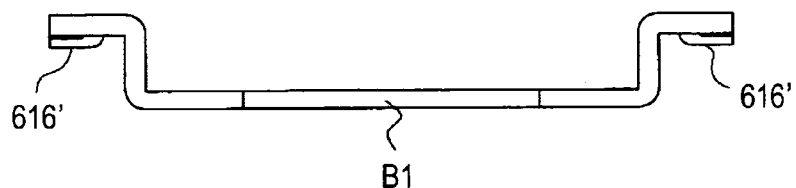
Figure 22C:
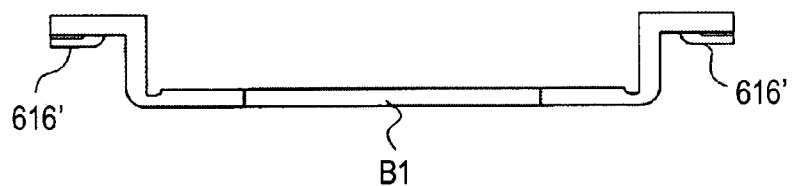
Figure 22D:
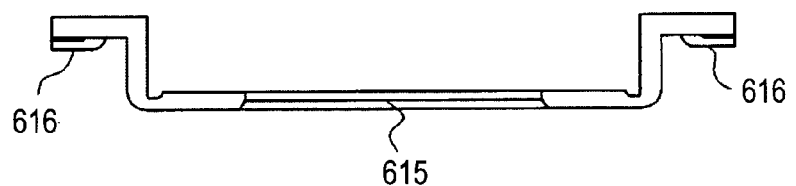
Figure 22E:
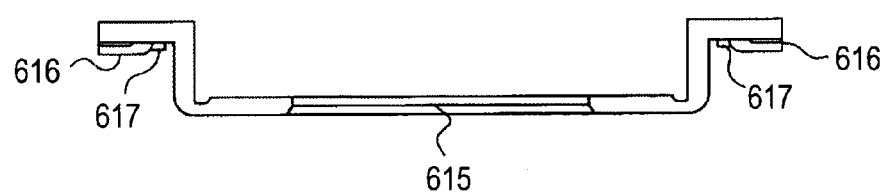
Figure 22F:
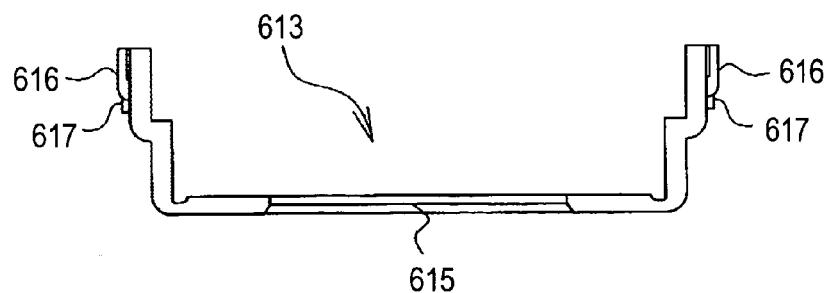
Figure 24D:
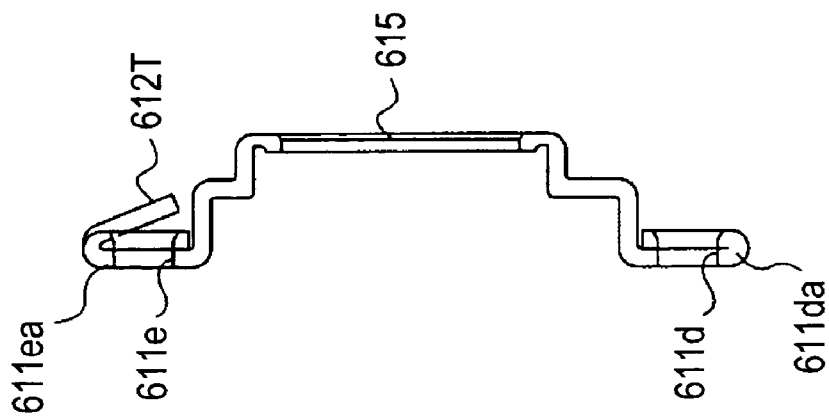
FIG. 24A to FIG. 24D are process diagrams showing a manufacturing process following processes of FIG. 23A to FIG. 23F.
Figure 24C:
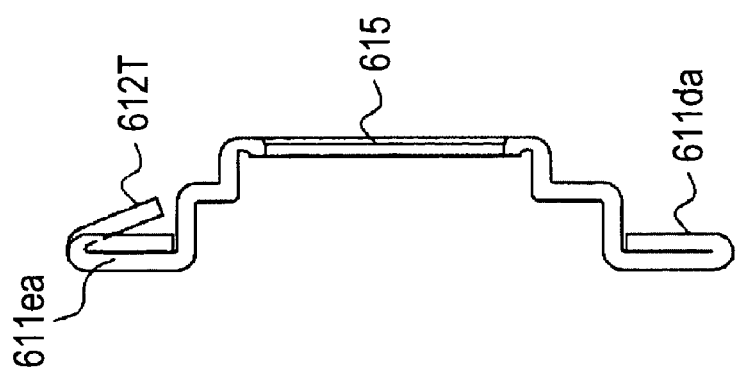
Figure 24B:
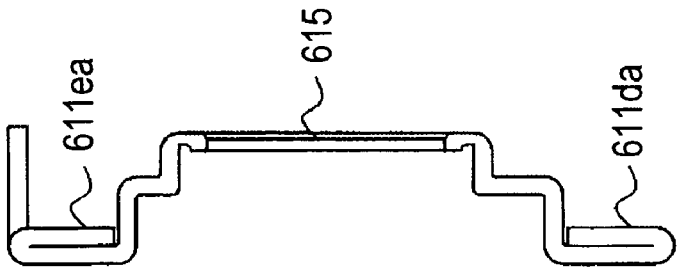
Figure 24A:
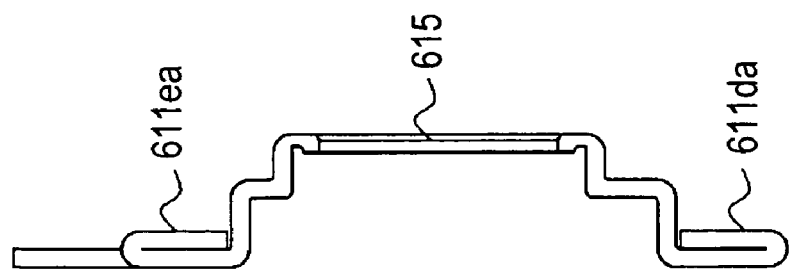

Next, in the process of FIG. 21, the attaching holes 611a to 611e are formed so as to penetrate through the respective pedestal portions 611aa to 611ea. The attaching holes 611a to 611e are formed by the following process. The respective predetermined positions of the pedestal portions 611aa to 611ea are drilled by a laser beam machine to form holes having a predetermined diameter, and then the circumferential edges of the holes are chamfered. In the present embodiment, the attaching holes 611a to 611e are formed in the pedestal portions 611aa to 611ea where the plate member 610b is bent at 180 degrees so as to be folded with double layers. Therefore, the attaching holes 611a to 611e can be formed to have a desired height and strength.

In the chamfered attaching holes 611a to 611e, for example, when a screw is fixed to each of the attaching holes by an adhesive, the adhesive is reserved in the clearance between the chamfered portion of the attaching hole and the screw, so that the screw can be relatively reliably fixed by the adhesive. Alternately, when a flat countersunk head screw is used, the shape of the screw coincides with that of the attaching hole, so that the fixing can be more reliably performed. As such, the frame 610 including the attaching holes 611a to 611e is completed. As described above, the frame 610 has various functions of cooling the liquid crystal panel 500, hanging the hook 627, reserving an adhesive, attaching and the like. In the present embodiment, however, such a structure can be formed only by a pressing process, so that the frame 610 can be manufactured with high productivity.

Even though all the attaching holes 611a to 611e are chamfered in this embodiment, all the holes do not need to be chamfered. For example, only the attaching holes 611c, 611d, and 611e which are mainly used may be chamfered.

FIG. 22A to FIG. 22F sequentially show main processes among the series of processes described so far, seen from the horizontal sectional surface. Moreover, FIGS. 22A to 22F correspond to the respective processes of FIGS. 10, 11, 12, 13, 17, and 18.

In addition, FIGS. 23A to 23F and FIGS. 24A to 24D sequentially shows main processes among the series of processes described so far, seen from the vertical sectional surface. FIGS. 23A to 23F correspond to the respective processes of FIGS. 10 to 15. Moreover, FIGS. 24A to 24D correspond to the respective processes of FIGS. 16, 19, 20, and 21.

The cover member 620 is manufactured by the following method. For example, a thin metal plate is clipped to have the contour shape shown in FIG. 4, the window 625 is opened, and the hooks 627 are bent. As described above, the mounting case 601 according to the present embodiment is manufactured.

Moreover, the liquid crystal panel 500 can be manufactured, for example, by a general method. In the manufactured liquid crystal panel 500, the external circuit connection terminal 102 thereof is connected to the FPC 501, and the FPC 501 is led out from the opening 614 to the outside to be fitted into the main body 613 of the frame 610. At that time, an adhesive has been previously supplied inside the frame 610, so that the liquid crystal panel 500 and the frame 610 are bonded to each other. Inside the frame 610, an adhesive is reserved in the adhesive reservoir 616a, so that the liquid crystal panel 500 can be relatively reliably bonded to the frame 610.

Further, with the hook 627 of the cover member 620 being hanged on the claw portion 617 on the side surface of frame 610, the cover member 620 is mounted on the side of the exposed surface of the liquid crystal panel 500 in the frame 610. When mounting the cover member 620, the hook 627 is guided by the steps of the guide portion 616 provided in both sides of the claw portion 617, so that the hook 627 can be reliably hanged on the claw portion 617. As such, the liquid crystal light valve 100 according to the present embodiment is manufactured.

As described above, the mounting case 601 according to the present embodiment can be manufactured with more stable quality and at lower cost than in die-casting molding, because a pressing process is performed in almost all the processes in order to manufacture the frame 601. Furthermore, since the frame 610 has an excellent cooling function by including the blade 614F and the cooling air introducing portion 612, the mounting case 601 can be sufficiently utilized. Specifically, as described above, the liquid crystal panel 500 is efficiently cooled by the actions of the blade 614F and the cooling air introducing portion 612. Therefore, the liquid crystal layer 50 in the liquid crystal panel 500 is previously prevented from being deteriorated and hot spots are also previously prevented from occurring, so that a display quality in the liquid crystal light valve 100 and thus the liquid crystal projector 1100 can be prevented from being degraded.

Moreover, the method of manufacturing the mounting case, which has been described above, is a specific example of the method of manufacturing the mounting case according to the invention. For example, the process sequence can be modified or the process can be altered in accordance with the frame structure.

Modified Example According to Attaching Hole

Figure 25:
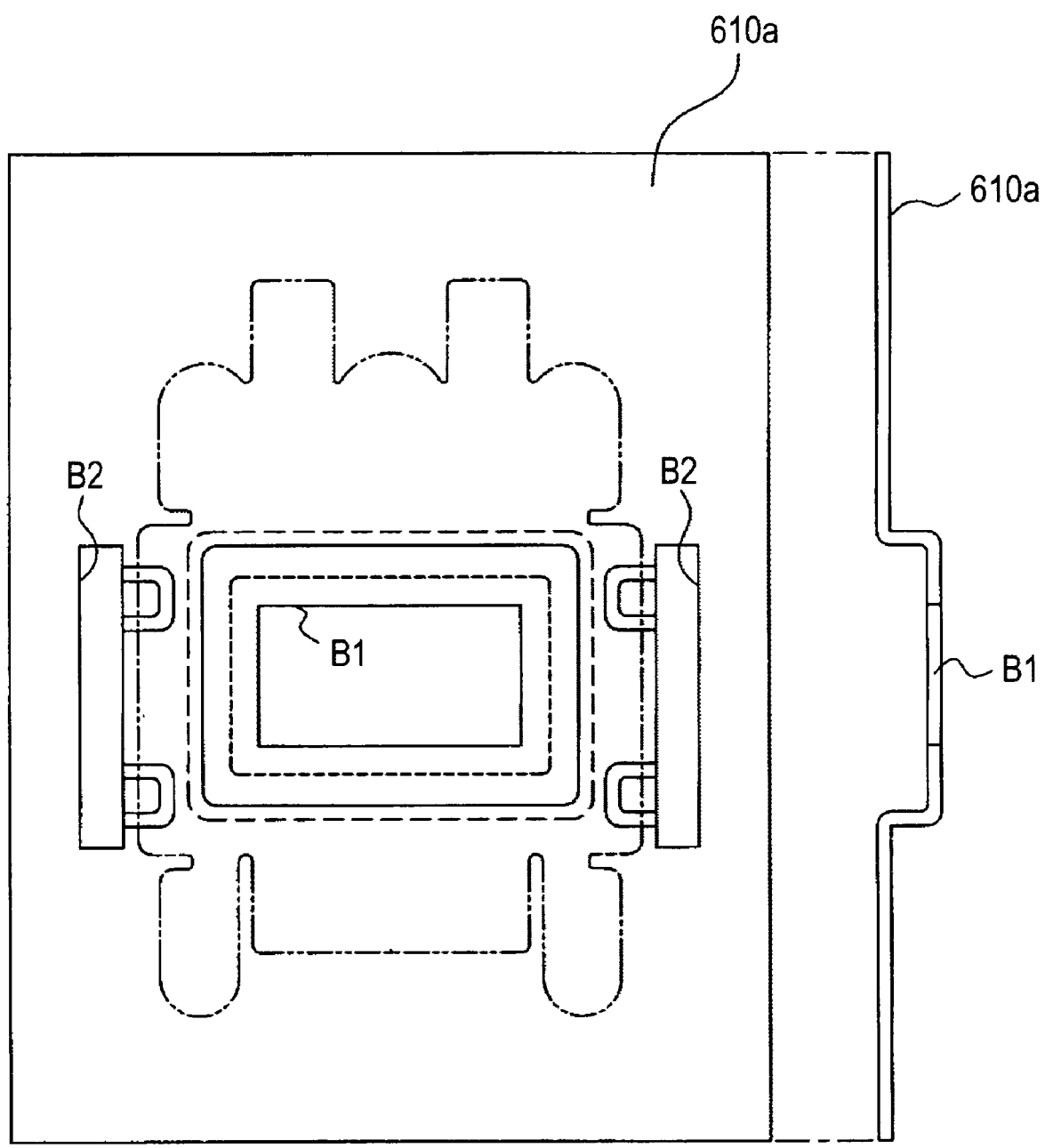
FIG. 25 is a process diagram for explaining a method of manufacturing a modified example of a mounting case according to an embodiment.
Figure 29:
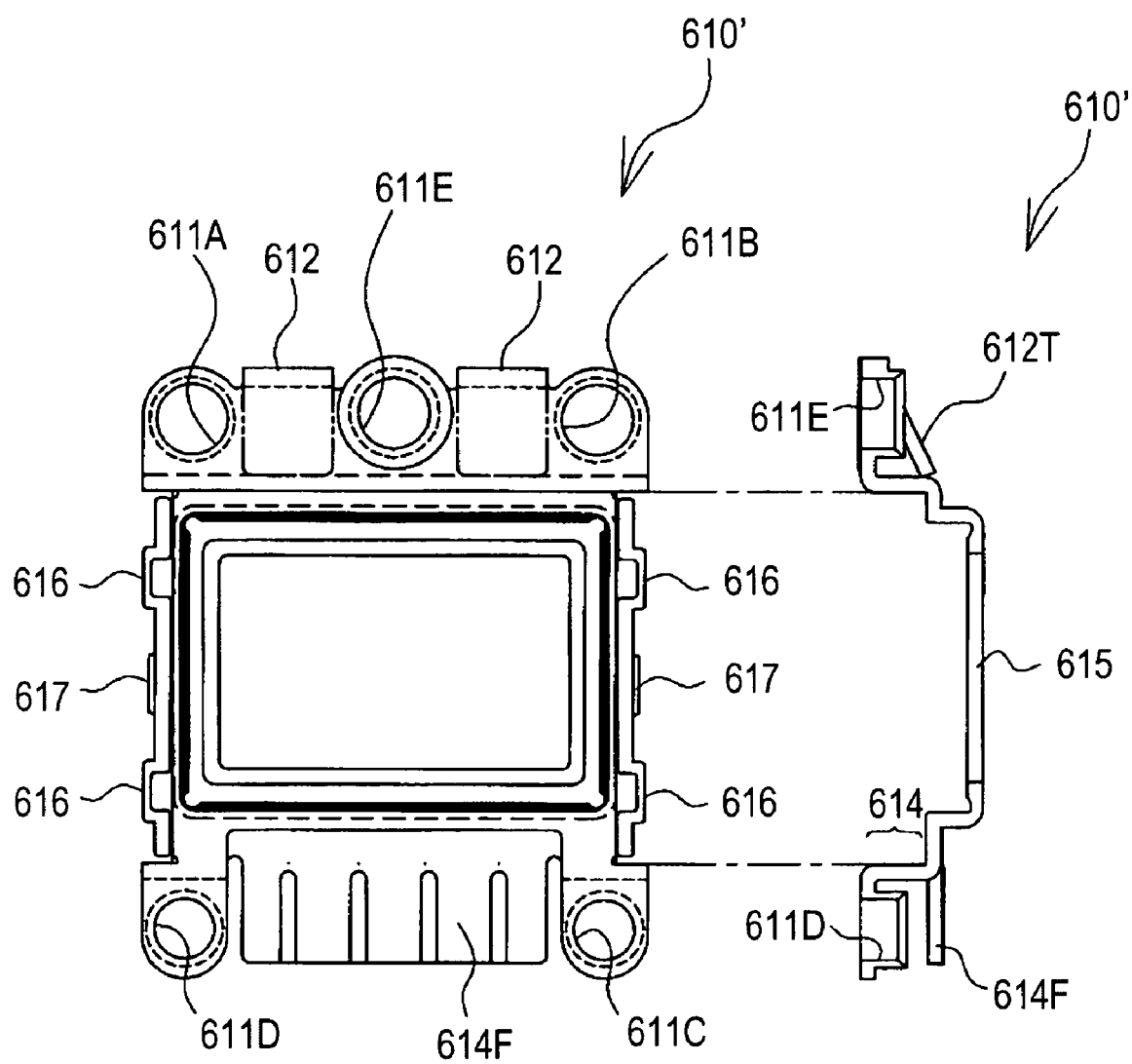
FIG. 29 is a process diagram showing a manufacturing process following the process of FIG. 28.
Figure 30C:
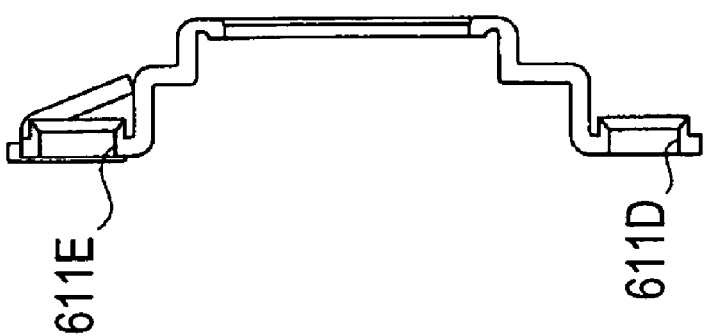
FIG. 30A to FIG. 30C are process diagrams showing details of the process of FIG. 29.
Figure 30B:
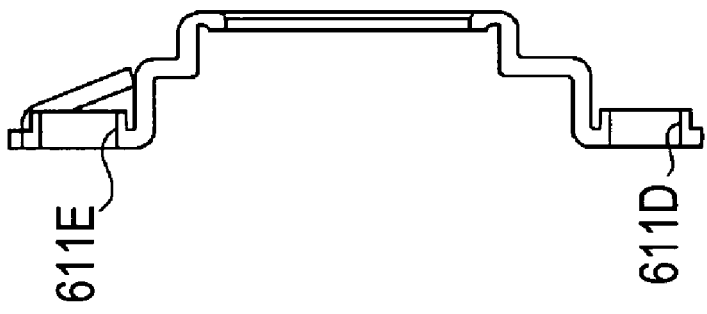
Figure 30A:
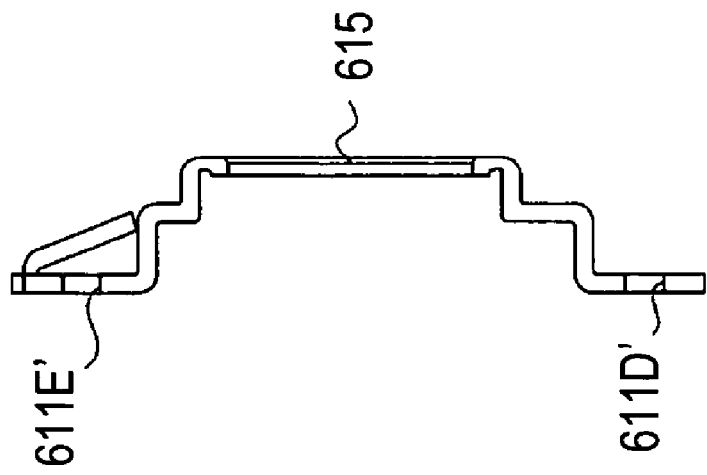

Next, modified examples of the attaching holes 611a to 611e will be described with reference to FIGS. 25 to 30. FIGS. 25 and 29 sequentially show the processes of manufacturing a frame according to the modified example. FIGS. 30A to 30C show the process of FIG. 29 in more detail. Moreover, in the present modified example, the same reference numerals are denoted to the same components as those of the above-described embodiment, and the descriptions thereof will be omitted.

Figure 26:
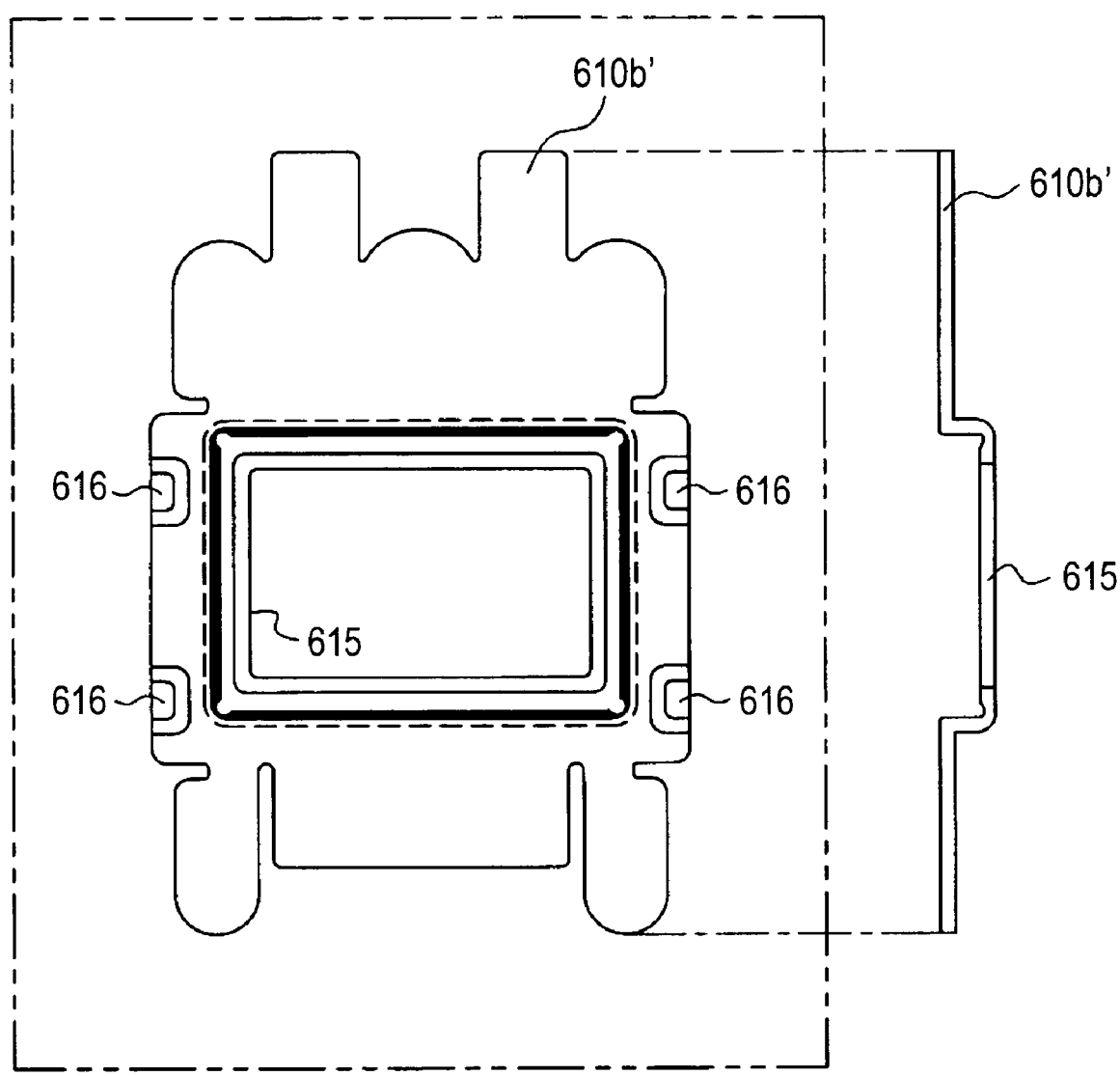
FIG. 26 is a process diagram showing a manufacturing process following the process of FIG. 25.

In the above-described embodiment, the case has been described where the attaching holes 611a to 611e are formed in the pedestal portions 611aa to 611ea. Like a frame 610' shown in FIG. 30C, the attaching hole may be formed by a burring process. In this case, the plate member 610a, which is formed the same as the above embodiment, is clipped like a plate member 610b', as shown in FIGS. 25 and 26. Comparing the contour shape of the plate member 610b' with the plate member 610b of the above embodiment, the dimensions of the respective portions where the attaching holes 611a to 611e are provided are reduced by the portions which are not folded.

Further, as shown in FIG. 27, the claw portion 617 and the blade 614F are formed by the process corresponding to FIG. 17, and circles are marked on the respective portions where the attaching holes 611c, 611d, and 611e will be provided. Subsequently, as shown in FIG. 28, both side edges of the bottom portion are bent, and the guide portions 612 are formed.

After that, as shown in FIG. 29, attaching holes 611A to 611E are formed on respective predetermined portions of the plate member 610b' by a burring process. Specifically, as shown in FIG. 30A, prepared holes 611A' to 611E' are first formed by a laser beam machine. In FIGS. 30A to 30C, although only the attaching holes 611D and 611E are shown, the other attaching holes are processed the same.

Next, in the process of FIG. 30B, the prepared holes 611A' to 611E' are subjected to a burring process. In other words, the respective prepared holes 611A' to 611E' are stretched in a cylindrical shape to be flanged, so that the attaching holes 611A to 611E are formed. At this time, the formed plate member 610b' may be considered to be the frame 610' so that the manufacturing is terminated. Here, the surface mounting is further performed on the attaching holes 611A to 611E in the process of FIG. 30C. As such, the frame 610' shown in FIG. 29 is completed.

Moreover, like the above embodiment, the sequence of the respective processes may be changed even in the modified example. For example, the forming of attaching holes may be performed more previously, and only the processing of prepared hole may be performed in advance.

Modified Example of Blade

Next, a modified example of the blade 614F will be described with reference to FIGS. 31 and 32.

In the blade 614F of the above embodiment, the steps 614a are formed on both sides by a half punching process. A blade in the invention may extend from the main body to the outside of the main body so as to have the radiation effect, and various modifications are available in addition to the above embodiment. For example, the surface of the blade may be made flat so that a device to increase the surface area is not necessary. In addition, the blade may combine functions other than the heat radiating function.

In addition, in order to promote the heat radiation, it is preferable that the concave and convex portions extending in the direction of cooling air like the steps 614a be formed to adjust the direction of the cooling air. For example, in a modified example shown in FIG. 31A, the outer edge of the blade 624F is partially punched out to be formed in a comb-teeth-like shape. In addition, in a modified example shown in FIG. 31B, the blade 634F is formed so that a plurality of projecting portions 634a extending in the direction of cooling air are arranged on the outer edge. The projecting portion 634a is formed by partially cutting and raising the outer edge, for example.

Figure 31A:
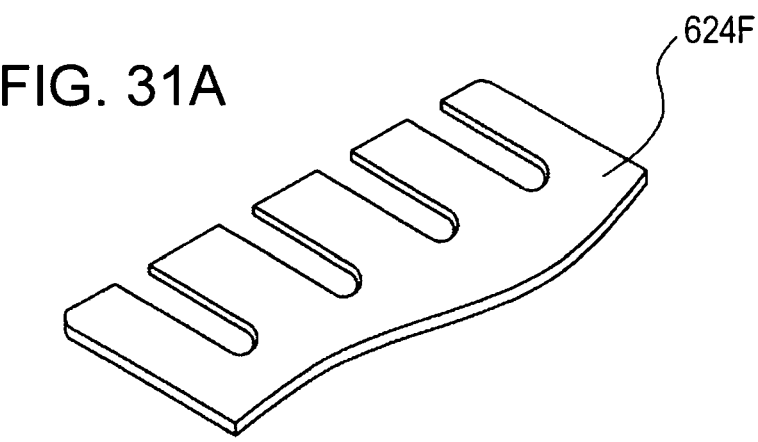
FIG. 31A is a partial perspective view showing a modified example of a blade in the electro-optical device according to the embodiment.
Figure 31B:
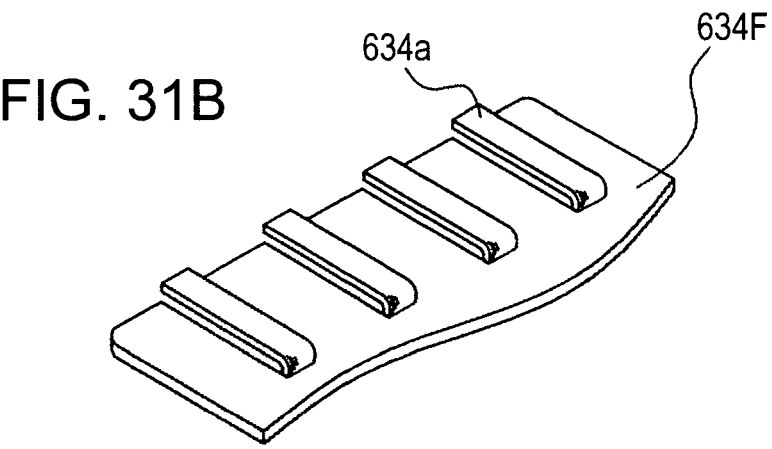
FIG. 31B is a partial perspective view showing a modified example of a blade in the electro-optical device according to the embodiment.
Figure 32:
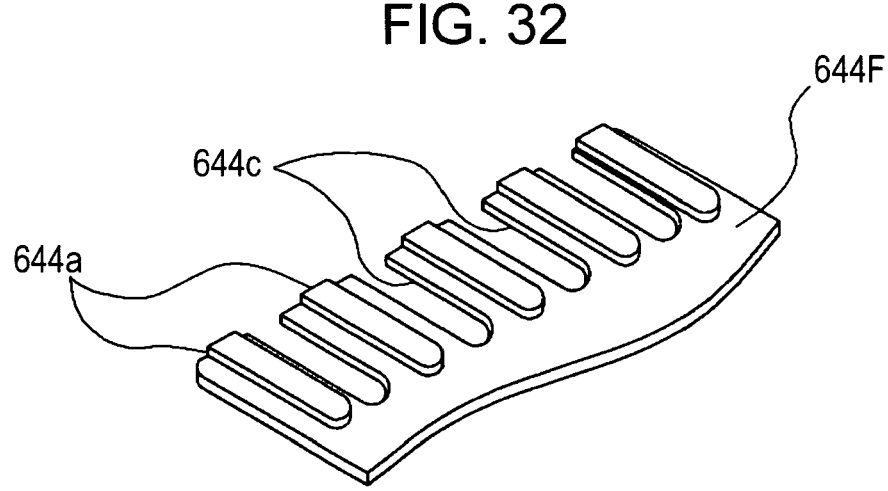
FIG. 32 is a partial perspective view showing other modified examples of a blades in the electro-optical device according to the embodiment.

Further, in a modified example shown in FIG. 32, the blade 644F is constructed by a combination of comb-teeth-like portions 644c formed by a press punching as shown in FIG. 31A and the step 644a formed by the half punching as shown in FIG. 4.

The invention is not limited to the above-described embodiments and examples, but various modifications can be made within the scope without departing from the subject matter or spirit of the invention defined by the appended claims and the entire specification. Therefore, a mounting case for an electro-optical device, a method of manufacturing the mounting case, an electro-optical device, and an electronic apparatus that accompany such modifications still fall within the technical scope of the invention. Moreover, in the above-described embodiment, the liquid crystal light valve including a liquid crystal panel has been described as an example, but an electro-optical device according to the embodiment of the invention may include as an electro-optical panel various display devices such as an electroluminescent device, an electrophoresis device, a display device using an electron emission element (Field Emission Display and Surface-Conduction Electron-Emitter Display) in addition to a liquid crystal panel. Further, an electronic apparatus according to the embodiment of the invention including such an electro-optical device may not be a projection-type projector but a reflection-type projector. In addition to that, the electronic apparatus of the invention may include various electronic apparatuses such as a television receiver, a cellular phone, an electronic organizer, a word processor, a view-finder-type or monitor-direct-view-type video tape recorder, a workstation, a video phone, a POS terminal, a touch panel.

What is claimed is:

1. A mounting case for an electro-optical device, the mounting case comprising a plurality of members formed of a plate, the plurality of members comprising:
   a main body configured to surround the sides of an electro-optical device, the main body comprising a window corresponding to a display region of the electro-optical device;
   a heat-radiating blade configured to radiate heat; and
   a cooling air introducing portion configured to guide cooling air over the window and toward the heat-radiating blade, the cooling air introducing portion comprising a sloped surface formed by folding a peripheral portion of the main body back toward the window of the main body so as to define a cavity that increases an exposed surface area of the mounting case.

2. The mounting case according to claim 1, wherein the heat-radiating blade comprises a plurality of steps formed by a half punching process.

3. The mounting case according to claim 1, wherein at least a portion of the heat-radiating blade is formed in a comb-teeth-like shape.

4. The mounting case according to claim 1, further comprising an electro-optical device disposed within the mounting case that includes a flexible wiring substrate that sends an electric signal to an electro-optical panel disposed within the window of the main body and wherein the mounting case includes an opening formed below the heat-radiating blade for receiving the flexible wiring substrate.

5. The mounting case according to claim 1, wherein at least the main body, the cooling air introducing portion, and the heat-radiating blade are formed from a single plate member.

6. An electronic apparatus comprising the mounting case to claim 1.

7. A method of manufacturing a mounting case for an electro-optical device from a plate, the method comprising:
   forming a main body configured to surround the sides of an electro-optical device, the main body comprising a window corresponding to a display region of the electro-optical device;
   forming a heat-radiating blade configured to radiate heat; and
   forming a cooling air introducing portion configured to guide cooling air over the window and toward the heat-radiating blade, the cooling air introducing portion comprising a sloped surface formed by folding a peripheral portion of the main body back toward the window of the main body so as to define a cavity that increases an exposed surface area of the mounting case.

8. The mounting case according to claim 5 wherein a surface of the heat-radiating blade comprises liner steps formed by a half-punching process.

9. The mounting case according to claim 5 wherein a surface of the heat-radiating blade is formed in a comb-teeth-like shape.

10. The mounting case according to claim 5, wherein the sloped surface of the cooling air introducing portion is approximately forty-five degrees.

11. The mounting case according to claim 5, further including a plurality of cooling air introducing portions, each of the cooling air introducing portions being adjacent to each other and separated by a gap.

12. A method of manufacturing a mounting case for a liquid crystal panel having an image display region and a side edge, the method comprising the steps of:
   providing a single plate member having a first end and a second end, the first end and the second end being directly across from each other;
   forming a main body from the single plate member using a pressing process, the step of forming a main body including:
      forming a bottom portion from the single plate member for surrounding the image display region of the liquid crystal panel, and
      forming side portions continuous with the bottom portion for surrounding the side edge of the liquid crystal panel;
   forming a heat-radiating blade at the first end of the single plate member using a pressing process, the heat-radiating blade extending from one of the side portions in a direction away from the main body;
   forming a window within the bottom portion of the main body using a punching process; and
   forming a cooling air introducing portion at the second end of the single plate member using a pressing process and a bending process so as to form a slope for directing cooling air across the bottom portion of the main body and over the heat-radiating blade for cooling the liquid crystal panel.

13. The method of claim 12 wherein the slope of the cooling air introducing portion is approximately forty-five degrees.

14. The method of claim 12 further comprising the step of forming linear steps in the heat-radiating blade using a half-punching process.

15. The method of claim 12 further comprising the step of forming the heat-radiating blade in a comb-teeth shape.

16. The mounting case according to claim 1 wherein the slope of the cooling air introducing portion is approximately forty-five degrees.

* * * * *